(12) United States Patent
Karaoguz et al.

(10) Patent No.: US 9,013,546 B2
(45) Date of Patent: Apr. 21, 2015

(54) ADAPTABLE MEDIA STREAM SERVICING TWO AND THREE DIMENSIONAL CONTENT

(75) Inventors: Jeyhan Karaoguz, Irvine, CA (US);
James D. Bennett, Hroznetin (CZ);
Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 462 days.

(21) Appl. No.: 12/982,212

(22) Filed: Dec. 30, 2010

(65) Prior Publication Data

US 2011/0164111 A1 Jul. 7, 2011

Related U.S. Application Data

(60) Provisional application No. 61/303,119, filed on Feb. 10, 2010, provisional application No. 61/291,818, filed on Dec. 31, 2009.

(51) Int. Cl.
*H04N 15/00* (2006.01)
*H04N 13/00* (2006.01)
(Continued)

(52) U.S. Cl.
CPC .............. *H04N 13/0497* (2013.01); *G06F 3/14* (2013.01); *G09G 3/003* (2013.01); *G09G 3/20* (2013.01); *G09G 5/003* (2013.01); *G09G 5/14* (2013.01);
(Continued)

(58) Field of Classification Search
CPC .. G06F 3/14; H04N 13/0413; H04N 13/0029; H04N 13/0048; H04N 13/0055; H04N 13/0059; G09G 3/20
USPC ........................................................ 348/43
See application file for complete search history.

(56) References Cited

U.S. PATENT DOCUMENTS

| | | | |
|---|---|---|---|
| 4,829,365 A | 5/1989 | Eichenlaub | |
| 5,615,046 A | 3/1997 | Gilchrist | |

(Continued)

FOREIGN PATENT DOCUMENTS

| | | | |
|---|---|---|---|
| EP | 0833183 A1 | 4/1998 | |
| EP | 1662808 A1 | 5/2006 | |

(Continued)

OTHER PUBLICATIONS

European Search Report received for European Patent application No. 10015984.7, mailed on May 3, 2011, 3 pages.
(Continued)

*Primary Examiner* — Hee-Yong Kim
(74) *Attorney, Agent, or Firm* — Fiala & Weaver P.L.L.C.

(57) ABSTRACT

Media sources that deliver at least portions of media content to viewer systems are described. The media content represents a plurality of camera perspectives of a single media product. A first request and a second request are both received. The first request is from a first viewer system and the second request is from a second viewer system. The first request is responded to by delivering a primary media stream to the first viewer system. The primary media stream contains a representation of at least a first of the plurality of camera perspectives. The second request is responded to by delivering both the primary media stream and a secondary media stream to the second viewer system. The secondary media stream contains a representation of at least a second of the plurality of camera perspectives. The second viewer system combines the primary and secondary media streams to display a three-dimensional view.

21 Claims, 9 Drawing Sheets

(51) Int. Cl.
| | | |
|---|---|---|
| *H04N 13/04* | (2006.01) | |
| *H04N 9/47* | (2006.01) | |
| *G02F 1/1335* | (2006.01) | |
| *G06F 15/16* | (2006.01) | |
| *G06F 3/14* | (2006.01) | |
| *G09G 3/00* | (2006.01) | |
| *G09G 3/20* | (2006.01) | |
| *H04N 21/235* | (2011.01) | |
| *H04N 21/41* | (2011.01) | |
| *H04N 21/435* | (2011.01) | |
| *G03B 35/24* | (2006.01) | |
| *H04S 7/00* | (2006.01) | |
| *G09G 5/00* | (2006.01) | |
| *G09G 5/14* | (2006.01) | |

(52) U.S. Cl.
CPC .... *G09G 2300/023* (2013.01); *G09G 2320/028* (2013.01); *G09G 2370/04* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0456* (2013.01); *H04N 13/0468* (2013.01); *H04N 21/235* (2013.01); *H04N 21/4122* (2013.01); *H04N 21/435* (2013.01); *H04N 2013/0463* (2013.01); *H04N 2013/0465* (2013.01); *G03B 35/24* (2013.01); *H04N 13/0413* (2013.01); *H04S 7/303* (2013.01)

(56) References Cited

U.S. PATENT DOCUMENTS

| | | | |
|---|---|---|---|
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A * | 11/2000 | Jain et al. | 715/251 |
| 6,188,442 B1 | 2/2001 | Narayanaswami | |
| 6,591,306 B1 * | 7/2003 | Redlich | 709/245 |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,123,213 B2 | 10/2006 | Yamazaki et al. | |
| 7,359,105 B2 | 4/2008 | Jacobs et al. | |
| 7,440,193 B2 | 10/2008 | Gunasekaran et al. | |
| 7,511,774 B2 | 3/2009 | Lee et al. | |
| 7,626,644 B2 | 12/2009 | Shestak et al. | |
| 7,646,451 B2 | 1/2010 | Vogel et al. | |
| 7,885,079 B2 | 2/2011 | Chen et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,049,710 B2 | 11/2011 | Shestak et al. | |
| 8,139,024 B2 | 3/2012 | Daiku | |
| 8,154,799 B2 | 4/2012 | Kim et al. | |
| 8,174,564 B2 | 5/2012 | Kim et al. | |
| 8,209,396 B1 | 6/2012 | Raman et al. | |
| 8,284,119 B2 | 10/2012 | Kim et al. | |
| 8,310,527 B2 | 11/2012 | Ko et al. | |
| 8,363,928 B1 * | 1/2013 | Sharp | 382/154 |
| 8,368,745 B2 | 2/2013 | Nam et al. | |
| 8,384,774 B2 | 2/2013 | Gallagher | |
| 8,411,746 B2 | 4/2013 | Chen et al. | |
| 2002/0010798 A1 | 1/2002 | Ben-Shaul et al. | |
| 2002/0167862 A1 | 11/2002 | Tomasi et al. | |
| 2002/0171666 A1 | 11/2002 | Endo et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 * | 2/2004 | Yun et al. | 348/51 |
| 2004/0036763 A1 | 2/2004 | Swift et al. | |
| 2004/0041747 A1 | 3/2004 | Uehara et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1 | 12/2004 | Alden | |
| 2005/0073472 A1 | 4/2005 | Kim et al. | |
| 2005/0128353 A1 | 6/2005 | Young et al. | |
| 2006/0050785 A1 | 3/2006 | Watanabe et al. | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1 | 11/2006 | Novack et al. | |
| 2007/0008406 A1 | 1/2007 | Shestak et al. | |
| 2007/0008620 A1 | 1/2007 | Shestak et al. | |
| 2007/0052807 A1 * | 3/2007 | Zhou et al. | 348/159 |
| 2007/0085814 A1 | 4/2007 | Ijzerman et al. | |
| 2007/0096125 A1 | 5/2007 | Vogel et al. | |
| 2007/0097103 A1 | 5/2007 | Yoshioka et al. | |
| 2007/0139371 A1 | 6/2007 | Harsham et al. | |
| 2007/0146267 A1 | 6/2007 | Jang et al. | |
| 2007/0147827 A1 * | 6/2007 | Sheynman et al. | 396/325 |
| 2007/0153916 A1 | 7/2007 | Demircin et al. | |
| 2007/0162392 A1 * | 7/2007 | McEnroe et al. | 705/51 |
| 2007/0258140 A1 | 11/2007 | Shestak et al. | |
| 2007/0270218 A1 | 11/2007 | Yoshida et al. | |
| 2007/0296874 A1 | 12/2007 | Yoshimoto et al. | |
| 2008/0025390 A1 | 1/2008 | Shi et al. | |
| 2008/0037120 A1 | 2/2008 | Koo et al. | |
| 2008/0068329 A1 | 3/2008 | Shestak et al. | |
| 2008/0126557 A1 | 5/2008 | Motoyama et al. | |
| 2008/0133122 A1 | 6/2008 | Mashitani et al. | |
| 2008/0143895 A1 * | 6/2008 | Peterka et al. | 349/15 |
| 2008/0150853 A1 | 6/2008 | Peng et al. | |
| 2008/0165176 A1 | 7/2008 | Archer et al. | |
| 2008/0168129 A1 | 7/2008 | Robbin et al. | |
| 2008/0191964 A1 | 8/2008 | Spengler | |
| 2008/0192112 A1 | 8/2008 | Hiramatsu et al. | |
| 2008/0246757 A1 | 10/2008 | Ito | |
| 2008/0259233 A1 | 10/2008 | Krijn et al. | |
| 2008/0273242 A1 | 11/2008 | Woodgate et al. | |
| 2008/0284844 A1 | 11/2008 | Woodgate et al. | |
| 2008/0303832 A1 | 12/2008 | Kim et al. | |
| 2009/0002178 A1 | 1/2009 | Guday et al. | |
| 2009/0010264 A1 | 1/2009 | Zhang | |
| 2009/0051759 A1 | 2/2009 | Adkins et al. | |
| 2009/0052164 A1 | 2/2009 | Kashiwagi et al. | |
| 2009/0058845 A1 | 3/2009 | Fukuda et al. | |
| 2009/0115783 A1 | 5/2009 | Eichenlaub | |
| 2009/0115800 A1 | 5/2009 | Berretty et al. | |
| 2009/0133051 A1 | 5/2009 | Hildreth | |
| 2009/0138805 A1 | 5/2009 | Hildreth | |
| 2009/0141182 A1 | 6/2009 | Miyashita et al. | |
| 2009/0174639 A1 | 7/2009 | Casner et al. | |
| 2009/0174700 A1 | 7/2009 | Daiku | |
| 2009/0319625 A1 * | 12/2009 | Kouhi | 709/206 |
| 2010/0066850 A1 | 3/2010 | Wilson et al. | |
| 2010/0071015 A1 | 3/2010 | Tomioka et al. | |
| 2010/0079374 A1 | 4/2010 | Cortenraad et al. | |
| 2010/0097525 A1 | 4/2010 | Mino | |
| 2010/0128112 A1 | 5/2010 | Marti et al. | |
| 2010/0135640 A1 | 6/2010 | Zucker et al. | |
| 2010/0208042 A1 | 8/2010 | Ikeda et al. | |
| 2010/0238274 A1 | 9/2010 | Kim et al. | |
| 2010/0238367 A1 | 9/2010 | Montgomery et al. | |
| 2010/0245548 A1 | 9/2010 | Sasaki et al. | |
| 2010/0259604 A1 * | 10/2010 | Surman | 348/54 |

(56) References Cited

U.S. PATENT DOCUMENTS

| | | |
|---|---|---|
| 2010/0272174 A1 | 10/2010 | Toma et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2012/0016917 A1 | 1/2012 | Priddle et al. |
| 2012/0081515 A1 | 4/2012 | Jang |
| 2012/0235900 A1 | 9/2012 | Border et al. |
| 2012/0308208 A1 | 12/2012 | Karaoguz et al. |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

IEEE 100 the Authoritative Dictionary of IEEE Standards Terms Seventh Edition, entry for "engine", IEEE 100-2000, 2000, pp. 349-411.

IEEE 100 the Authoritative Dictionary of IEEE Standards Terms Seventh Edition, entry for "Web page", IEEE 100-2000, 2000, pp. 1269-1287.

Wikipedia entry on "Scripting language" retrieved on Aug. 16, 2012, 4 pages.

"How browsers work", retrieved from <http://taligarsiel.com/Projects/howbrowserswork1.htm> on Oct. 21, 2010, Oct. 21, 2010, 54 pages.

Shan, et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006 , pp. 365-372.

Peterka, "Dynallax: Dynamic Parallax Barrier Autostereoscopic Display", Ph.D. Dissertation, University of Illinois at Chicago, 2007, 134 pages.

Yanagisawa, et al., "A Focus Distance Controlled 3DTV", Proc. SPIE vol. 3012, Stereoscopic Displays and Virtual Reality Systems IV, May 15, 1997, pp. 256-261.

EPO Communication received for European Patent Application No. 10016055.May 1904, dated Apr. 5, 2013, 6 pages.

Yanaka, Kazuhisa "Stereoscopic Display Technique for Web3D Images", SIGGRAPH 2009, New Orleans, Louisiana, Aug. 3-7, 2009, 1 page.

\* cited by examiner

ADAPTABLE MEDIA STREAM SERVICING TWO AND THREE DIMENSIONAL CONTENT

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/845,461, titled "Display Supporting Multiple Simultaneous 3D Views," filed Jul. 28, 2010;

U.S. patent application Ser. No. 12/774,307, titled "Display with Elastic Light Manipulator," filed May 5, 2010;

U.S. patent application Ser. No. 12/982,020, titled "Backlighting Array Supporting Adaptable Parallax Barrier," filed on same date herewith;

U.S. patent application Ser. No. 12/982,053, titled "Hierarchical Video Compression Supporting Selective Delivery of Two-Dimensional and Three-Dimensional Video Content," filed on same date herewith; and

BACKGROUND OF THE INVENTION

1. Field of the Invention

The present invention relates to techniques for delivering three-dimensional video content in media streams.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different resolutions, being configured for three-dimensional image viewing only, being switchable between two-dimensional image viewing and three-dimensional image viewing, and further capabilities and attributes. Such display devices may be delivered media streams from media sources for display.

BRIEF SUMMARY OF THE INVENTION

Methods, systems, and apparatuses are described for media sources that deliver media streams that include two-dimensional and three-dimensional content for display, and for viewer systems that receive and combine media streams for display, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
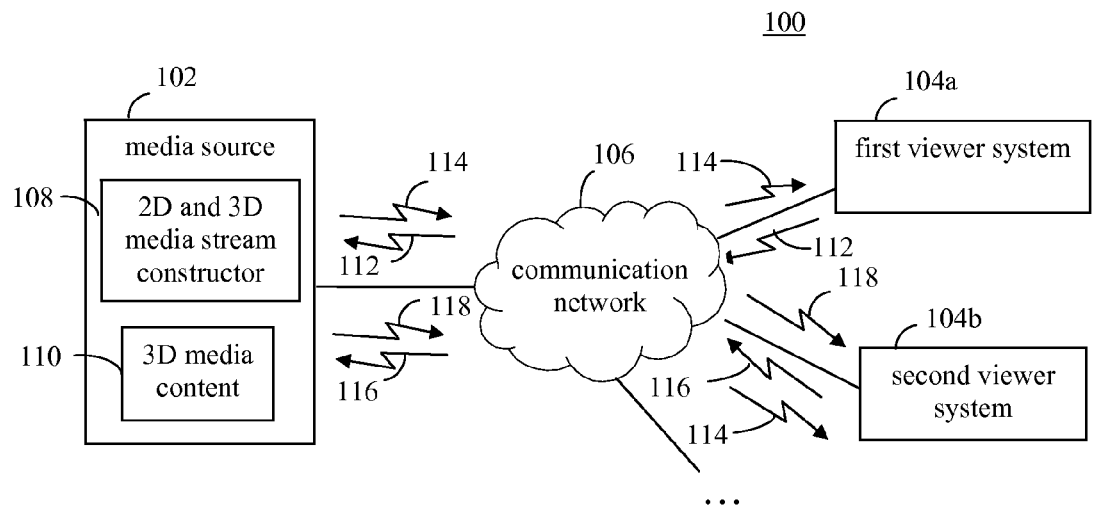
FIG. 1 shows a block diagram of a media content communication system in which a media source delivers 2D (two-dimensional) and 3D (three-dimensional) media content to viewer systems using multiple media streams, according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

The present invention relates to a media source (e.g., cable head-end, Internet server, etc.) that is capable of simultaneously and selectively directing streams of 2D (two-dimensional) and/or 3D (three-dimensional) video content to individual users or groups of users. The type of 2D and/or 3D content that may be transmitted to a particular individual or group may be determined based on various factors including, but not limited to, what type of content has been requested, what type of content has been paid for, user display capabilities, bandwidth constraints and the like. In an embodiment, the media source is capable of adapting the definition of the groups (e.g., unicast groups and multicast groups) as well as the type of content transmitted to such groups on the fly in response to changing demand and/or other conditions. For instance, in an embodiment, compressed 2D content (e.g., data for a single perspective view) may be broadcast to a first multicast group, and further content (e.g., data for one or more additional perspective views) may be simultaneously transmitted to one or more other smaller groups within the first multicast group that may be combined with the 2D content to form 3D content of one or more types for viewing, thereby enabling different users to view the same content in different modes (e.g., 2D, stereoscopic 3D, or multi-view 3D). In another embodiment, compressed 2D content may be broadcast to a multicast group, while compressed difference files that allow for 3D viewing of the 2D content may be simultaneously transmitted to one or more smaller groups within the large multicast group.

A media source may be a server device in a network outside of the underlying multiple viewers' premises. A media source may alternatively be any node in a media distribution infrastructure. For instance, nodes other than display devices may be tasked to forward content to "hungry" and "out of viewing sync" viewer systems. Any such node that routes content downstream to two or more different viewer systems (e.g., a camera, server or a routing node) can take advantage of embodiments of the present invention. In other words, a "media source" can be a server, or can be any such node. A media source might be a server, a network node, or even a media system within a first viewer's premises that services the local viewer while servicing a second viewer in a second viewer's premises that is remote to the first viewer's premises (e.g., similar to a peer-to-peer sharing environment).

Numerous types of display devices may display 2D and 3D content that is transmitted in this manner. For example, the display devices may include one or more light manipulators, such as parallax barriers and/or lenticular lenses, to deliver 3D media content in the form of images or views to the eyes of the viewers. Other types may include display devices with 3D display pixel constructs (e.g., multiple layers of pixels that can be illuminated in the different layers to provide depth) that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for delivering media content streams from media sources to groups of viewer systems, followed by subsections that describe embodiments for exemplary display devices, media sources, and viewer systems. It is noted that the section/subsection headings provided herein are not intended to be limiting. Embodiments are described throughout this document, and any type of embodiment may be included under any section/subsection.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Media Content Delivery Embodiments

According to embodiments, a media source may deliver media content to groups of viewer systems in two-dimensional and three-dimensional form, as requested by the particular viewer systems. For example, the media content may be video content that is stored as data (e.g., frame sequences) corresponding to a plurality of perspective views. Depending on which portion of the data is delivered to a viewer system, a two-dimensional representation or a three-dimensional representation of the video content may be displayed. For instance, if data representative of a single perspective view is delivered to a viewer system, a single perspective view may be displayed by a display screen of the viewer system that is perceived by viewers as a two-dimensional view. If data representative of two or more perspective views are delivered to a viewer system, the two or more perspective views may be displayed by a display screen of the viewer system to be perceived as a three-dimensional view.

For instance, if a pair of perspective views is delivered to a viewer system, the pair of perspective views may be displayed by a display screen of the viewer system as a stereoscopic three-dimensional view. If two or more pairs of perspective views are delivered to a viewer system, the two or more pairs of perspective views may be displayed by a display screen of the viewer system to be perceived as a multiview 3D. For example, delivered media content may include "3Dx" or "3D-x" content having a number of "x" camera views (of corresponding perspective views), such as "3D-4," having four camera views, "3D-16," having sixteen camera views, etc. The pairs of camera views in addition to a first pair of camera views enable viewers to "view behind" the displayed 3D content corresponding to the first pair of camera view by moving their heads left-right while watching the display screen. In 3D-4, in a first position, a viewer may be delivered a first 3D view with a first pair of camera views (e.g., first left and right perspective views). When the viewer moves their head left or right to a second position, the viewer may be delivered a second 3D view with a second pair of camera views (e.g., second left and right perspective views) that is slightly different from the first 3D view, enabling the viewer to have the illusion of viewing slightly behind the objects displayed in the first 3D view. If the content has more camera views than 3D-4, the viewer may be enabled to view even further behind displayed objects by moving their head further left or right to further positions to be delivered further 3D views. Each pair of camera views (e.g., right and left perspective view pairs) may be represented by corresponding right and left frame sequences.

According to embodiments, media streams may be generated from media content that enable viewers to view the same media content in 2D form, stereoscopic 3D form, or multiview 3D form. Any number of one or more media streams may be generated from the media content to deliver the media content to any number of viewer systems to be viewed in 2D form and/or 3D form. For example, a first media stream that contains a first perspective view of the media content may be delivered to a first group of viewer systems to enable the media content to be displayed in 2D form. A second media stream may be generated that contains a second perspective view of the media content. The first and second media streams may be delivered to a second group of viewer systems to be combined and displayed in 3D form (a combined two perspective views). A third media stream may be generated that contains a pair of perspective views of the media content (that are different from the first and second pairs of perspective view). The first, second, and third media streams may be delivered to a third group of viewer systems to be combined and displayed in 3D-4 form (a combined four perspective views). A fourth media stream may be generated that includes the second perspective view and the pair of perspective views (three perspective views). The first and fourth media streams may be delivered to a fourth group of viewer systems to be combined and displayed in 3D-4 form (a combined four perspective views). Further media streams may be generated that contain one or more further perspective views of the media content that can be combined with any number of the other generated media streams to display multiview 3D content of any number of camera views (e.g., 3D-6, 3D-8, 3D-16, etc.).

Each media stream may be delivered to a particular viewer system group that may include a single viewer system (e.g., unicast) or may include multiple viewer systems (e.g., multicast), with each group either being distinct (e.g., does not include members of other groups) or overlapping with one or more other groups (e.g., includes one or more members of one or more other groups). For instance, in the example above, the second group of viewer systems may be included in the first group of viewer systems. Thus, to deliver the first and second media streams to the second group of viewer system, the first media stream may be delivered to the a first multicast group designated for the first group of viewer systems (which includes the members of the second viewer group), and the second media stream may be delivered to a second multicast group designated for the second group of viewer systems.

A system for delivering media content in this manner may be configured in various ways, in embodiments. For instance, FIG. 1 shows a block diagram of a media content communication system 100, according to an exemplary embodiment. As shown in FIG. 1, system 100 includes a media source 102 and a plurality of viewer systems 104. Media source 102 and viewer systems 104 are coupled by a communication network 106. Any number of viewer systems 104 may be present in system 100, including tens, hundreds, thousands, and even greater numbers of viewer systems 104. For example, and for ease of illustration, first and second viewer systems 104*a* and 104*b* are shown in FIG. 1. In system 100, media source 102 delivers media content in 2D (two-dimensional) and 3D (three-dimensional) form to viewer systems 104 using multiple media streams. System 100 is described as follows.

Media source 102 may be any type of media source device, such as a cable head-end, an Internet-based server, or other media source device. As shown in FIG. 1, media source device 102 includes a 2D and 3D media stream constructor 108 and 3D media content 110. 3D media content 110 may be any type of media content that include 3D video, including 3D video content that is stereoscopic 3D (two perspective views) or multiview 3D. For instance, 3D media content 110 may be compressed video content that is compressed according to a video compression standard such as MPEG-1, MPEG-2, MPEG-4, H.261, H.262, H.263, H.264, etc. 3D media content 110 may include data corresponding to two or more perspective views stored in a same file or other data structure, or in separate files/data structures. 2D and 3D media stream constructor 108 is configured to generate one or more media streams to deliver portions of 3D media content 110 to any number of viewer systems 104 that request related 2D or 3D media content. Media source 102 may includes storage for storing 3D media content 110, may generate 3D media content 110 internally, and/or may receive 3D media content 110 from an external source (e.g., from a satellite, from a server, from an application, etc.). Examples of such storage are described elsewhere herein.

Viewer systems 104 (e.g., first and second viewer systems 104a and 104b) may be any type of devices with display capability. For example, a viewer system 104 may be a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, a computer (e.g., a desktop computer), a display device (e.g., a high definition (HD) television, a projector), etc., or a home theater system receiver, a set-top box, a game console, or other device that is coupled with a display device.

Media source 102 and viewer systems 104 communicate with each other through communication network 106. For instance, in an embodiment, network 106 may include one or more wired and/or wireless communication networks, which may include one or more local area networks (LAN), wide area networks (WAN), personal area networks (PAN), or a combination of communication networks, such as the Internet, a cable-fiber network, and/or other type of communication network or link.

Figure 2A:
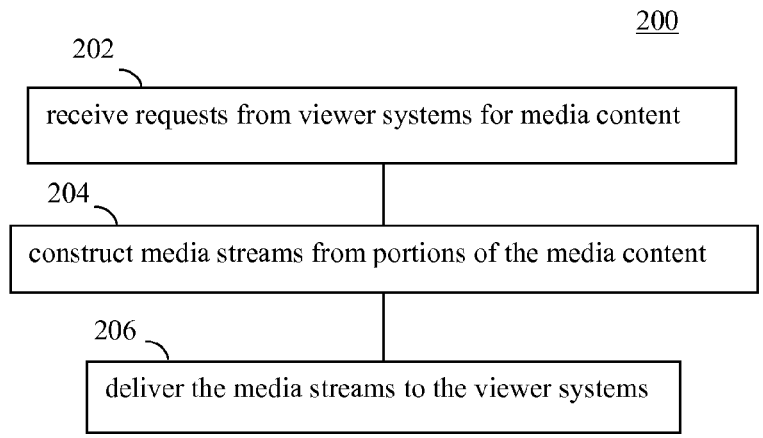
FIG. 2A shows a flowchart providing a process for delivering 2D and 3D media content to viewer systems using multiple media streams, according to exemplary embodiments.

As described above, media source 102 delivers media content in 2D and 3D form to viewer systems 104 using multiple media streams. For instance, FIG. 2A shows a flowchart 200 providing a process for delivering media content in the form of multiple media streams, according to an exemplary embodiment. Flowchart 200 may be performed by media source 102, in an exemplary embodiment. Further structural and operational embodiments will be apparent to persons skilled in the relevant art(s) based on the discussion regarding flowchart 200. Flowchart 200 is described as follows.

Flowchart 200 begins with step 202. In step 202, requests from viewer systems for media content are received. For example, as shown in FIG. 1, first viewer system 104a may generate and transmit a first media content request 112, and second viewer system 104b may generate and transmit a second media content request 116. First and second requests 112 and 116 are requests associated with 3D media content 110. Further requests may be received from further view systems 104 that may be present in system 100. As shown in FIG. 1, media source 102 receives first and second requests 112 and 116.

In step 204, media streams are constructed from portions of the media content. First and second requests 112 and 116 are requests associated with 3D media content 110. As such, 2D and 3D media stream constructor 108 determines from first and second requests 112 and 116 what portions of 3D media content 110 are respectively requested, which may be all or a part of 3D media content 110, and constructs one or more media streams to be transmitted from media source 102 in response. For example, if first and second requests 112 and 116 are requests for a same portion of 3D media content 110 (e.g., are both requests for a 2D version of 3D media content 110, for a stereoscopic 3D version of 3D media content 110, for a 3D multiview version of 3D media content 110 of a same type, etc.), constructor 108 may generate a single media stream to be transmitted to both of first and second viewer systems 104a and 104b in response (e.g., using multicasting). If first and second requests 112 and 116 are requests for different portions of 3D media content 110 (e.g., one request is a request for a portion that is a 2D version of 3D media content 110, for a stereoscopic 3D version of 3D media content 110, or for a 3D multiview version of 3D media content 110, etc., and the other request is a request for a different portion from the first request), constructor 108 may generate first and second media streams. In an embodiment, the first media stream may be transmitted to first viewer system 104a, and the first and second media streams may be transmitted to second viewer systems 104b, in response.

If a portion of 3D media content 110 to be transmitted to first and/or second viewer systems 104a and 104b is already being transmitted to one or more other viewer systems 104 in a media stream, instead of constructing a new media stream, constructor 108 may add first and/or second viewer 104a and 104b to an existing multicast group that includes the viewer systems 104 receiving the media stream. If one of first and/or second viewer systems 104a and 104b is the only viewer system to receive a media stream, the media stream may be unicast to the one of first and/or second viewer systems 104a and 104b. If a media stream is newly constructed to be transmitted to first and second viewer systems 104a and 104b in response to requests 112 and 116 (for the same portion of 3D media content 110), a new multicast group may be formed that includes first and second viewer systems 104a and 104b, and the new media stream may be multicast to the members of the new multicast group. Additional viewer systems 104 may be added to the new multicast group if they subsequently request the same portion of 3D media content 110. Furthermore, viewer systems 104 may be removed from a multicast group if they are no longer requesting 3D media content 110. As such, media source 102 may provide destination addressing that changes over time.

In the example of FIG. 1, second viewer system 104b requests (in request 116) a portion of 3D media content 110 that includes the portion of 3D media content 110 requested by first viewer system 104a (in request 112) plus a further portion of 3D media content 110. For example, first viewer system 104a may have requested a 2D version of 3D media content 110 (a first perspective view), and second viewer system 104b may have requested a 3D version of 3D media content 110 (e.g., at least the first perspective view and a second perspective view). In such case, a multicast group may be used or newly generated by constructor 108 that includes first and second viewer systems 104a and 104b for multicasting the portion of 3D media content 110 requested by first viewer system 104a to both of first and second viewer systems 104a and 104b. Furthermore, second viewer system 104b may be added to a multicast group that receives the further portion of 3D media content 110, or the further portion of 3D media content 110 may be transmitted to second viewer system 104b in a unicast signal.

In step 206, the media streams are delivered to the viewer systems. For instance, in the example of FIG. 1, media source 102 may transmit (e.g., multicast) a first media stream 114 that includes the portion of media content 110 requested by first viewer system 104a to both of first and second viewer systems 104a and 104b. Furthermore, media source 102 may transmit (e.g., unicast or multicast) a second media stream 118 that includes the further portion of media content 110 requested by second viewer system 104b to second viewer system 104b. As shown in FIG. 1, first and second viewer systems 104a and 104b receive first media stream 114, and second viewer system 104b receives second media stream 118.

Figure 2B:
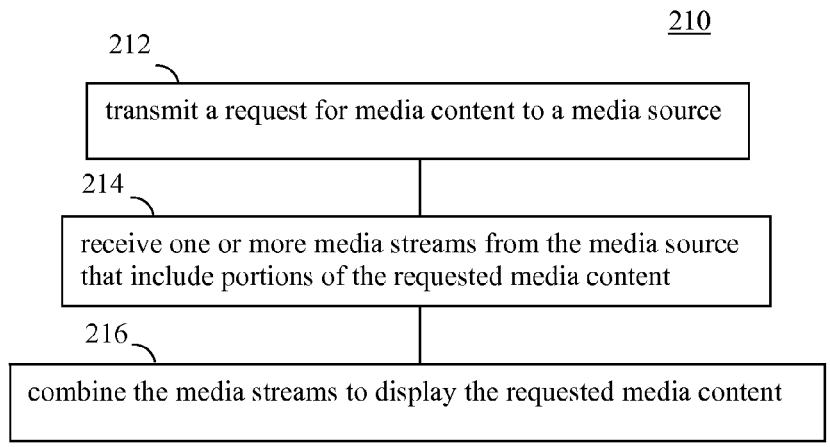
FIG. 2B shows a flowchart providing a process for requesting and receiving media content in multiple media streams, according to exemplary embodiments.

The media streams transmitted by media source 102 may be combined (when more than one media stream is received) and displayed by viewer systems 104. For instance, FIG. 2B shows a flowchart 210 providing a process for displaying media content received in the form of multiple media streams, according to an exemplary embodiment. Flowchart 210 may be performed by each viewer system 104 that receives multiple media streams (e.g., viewer system 104b), in an exemplary embodiment. Further structural and operational embodiments will be apparent to persons skilled in the relevant art(s) based on the discussion regarding flowchart 210. Flowchart 210 is described as follows.

Flowchart 210 begins with step 212. In step 212, a request for media content is transmitted to a media source. For example, as described above with respect to FIG. 1, first viewer system 104a may generate and transmit a first media content request 112, and second viewer system 104b may generate and transmit a second media content request 116. First and second requests 112 and 116 are requests associated with 3D media content 110.

In step 214, one or more media streams is/are received from the media source that include portions of the requested media content. For instance, as described above with respect to the example of FIG. 1, first viewer system 104a may receive first media stream 114, and second viewer system 104b may receive first and second media streams 114 and 118.

In step 216, the media streams are combined to display the requested media content (if multiple media streams are received). For instance, in the example of FIG. 1, first viewer system 104 received first media stream 114. As such, first viewer system 104a may display the video content received in first media stream 114 in a display screen of first viewer system 104a. If first media stream 114 includes a single perspective view of 3D media content 110, the display screen of first viewer system 104a may display the content received in first media stream 114 in 2D. If first media stream 114 includes two or more pairs of perspective views of 3D media content 110, the display screen of first viewer system 104a may display the content received in first media stream 114 in corresponding 3D.

Furthermore, in the example of FIG. 1, second viewer system 104b received first and second media streams 114 and 118. According to step 216, second viewer system 104b may combine the contents of first and second media streams 114 and 118, such as by interleaving or weaving frames of frames sequences respectively received in first and second media streams 114 and 118, and may display the resulting video content in a display screen of second viewer system 104b. For instance, if first media stream 114 includes a first perspective view of 3D media content 110, and second media stream 118 includes a second perspective view of 3D media content 110, second viewer system 104b may combine the first and second perspective views to be displayed as stereoscopic 3D in the display screen of second viewer system 104b. If additional perspective views are included in first and/or second media streams 114 and 118, second viewer system 104b may combine the perspective views into perspective view pairs to be displayed as multiview 3D in the display screen of second viewer system 104b.

Figure 3:
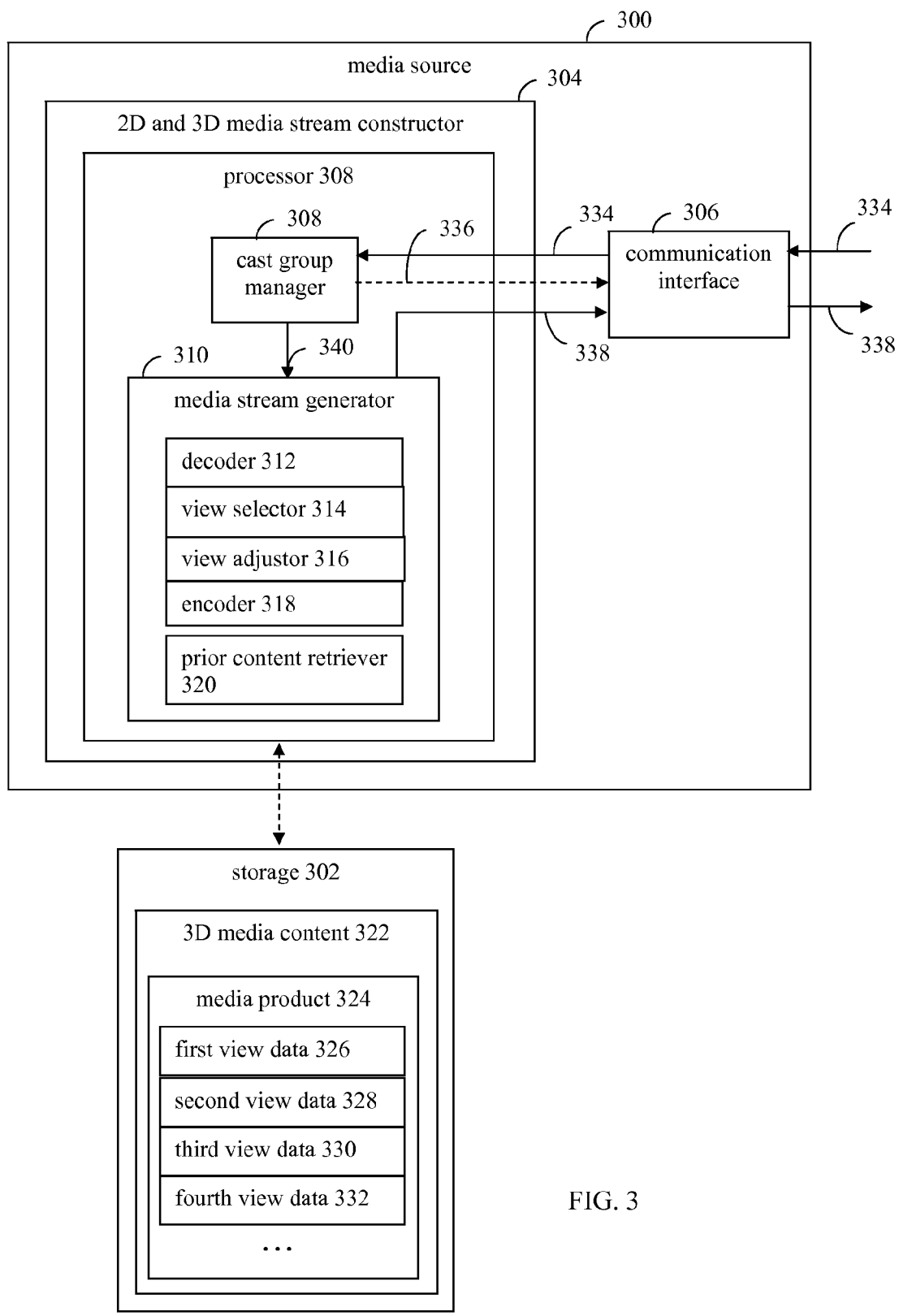
FIG. 3 shows a block diagram of a media source configured to deliver 2D and 3D content to viewer systems by constructing multiple media streams, according to an exemplary embodiment.
Figure 4:
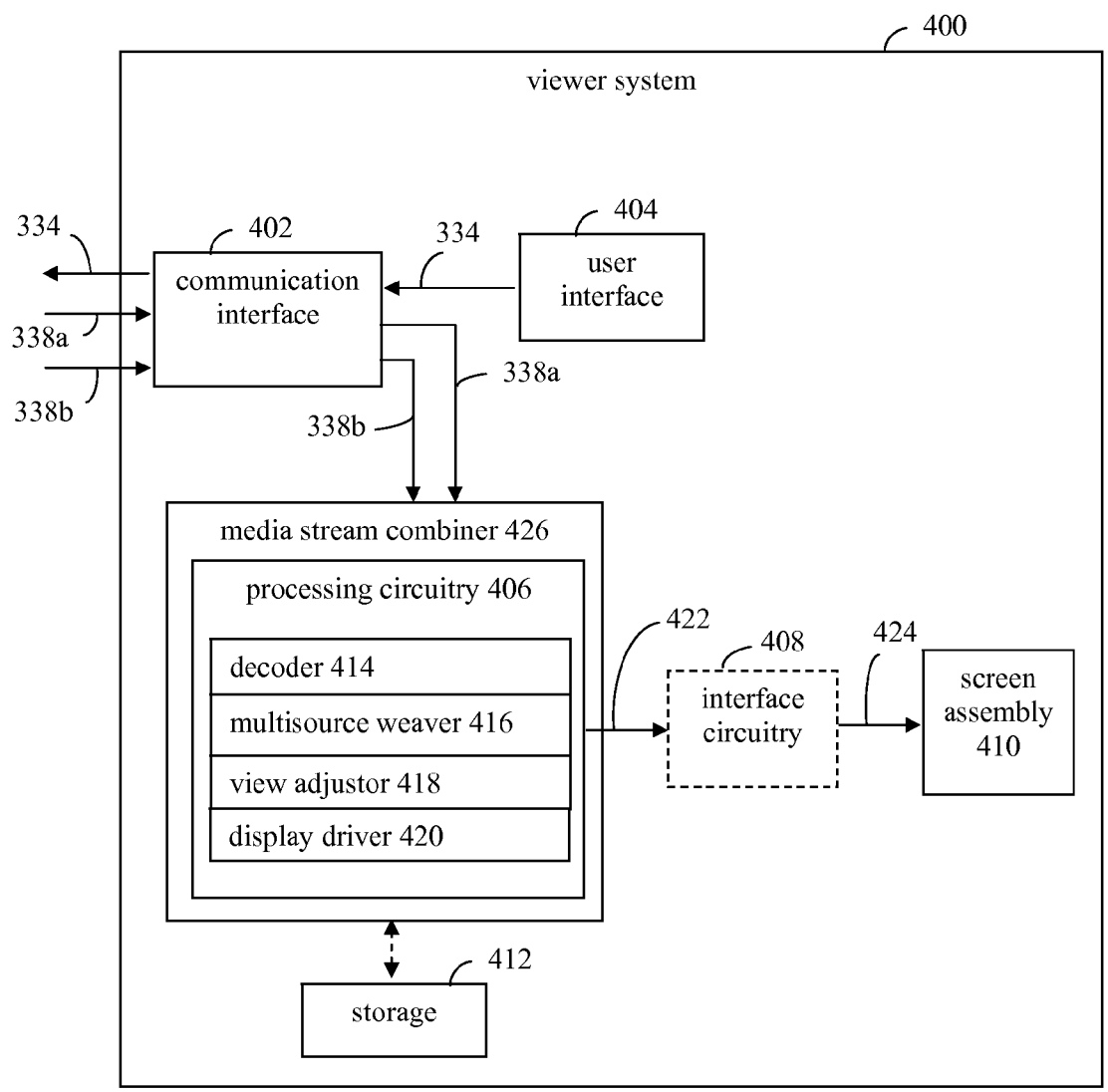
FIG. 4 shows a block diagram of a viewer system configured to receive and combine multiple media streams to view 3D media content, according to an exemplary embodiment.

Media source 102 and viewer systems 104 may be configured in various ways to perform their respective functions, in embodiments. For instance, FIG. 3 shows a block diagram of a media source 300 configured to deliver media content in 2D and 3D form to viewer systems by constructing multiple media streams, according to an exemplary embodiment. Media source 300 is an exemplary embodiment of media source 102. Furthermore, FIG. 4 shows a block diagram of a viewer system 400 configured to receive and combine multiple media streams to view 3D media content, according to an exemplary embodiment. Viewer system 400 is an exemplary embodiment of a viewer system 104. Media source 300 of FIG. 3 and viewer system 400 of FIG. 4 are described as follows.

As shown in FIG. 3, media source 300 is coupled to storage 302. Storage 302 may be external or internal to media source 300. Media source 300 includes a 2D and 3D media stream constructor 304 and a communication interface 306. 2D and 3D media stream constructor 304 is an example of 2D and 3D media stream constructor 108 of FIG. 1. 2D and 3D media stream constructor 304 includes a processor 308, which includes a cast group manager 308 and a media stream generator 310. Media stream generator 310 includes a decoder 312, a view selector 314, a view adjustor 316, an encoder 318, and a prior content retriever 320. Storage 302 includes 3D media content 322, which includes a media product 324. Media product 324 includes first view data 326, second view data 328, third view data 330, fourth view data 332, and optionally further view data. These features of media source 300 are described as follows.

Communication interface 306 interfaces media source 300 with a communication network, such as communication network 106 of FIG. 1, to be enabled to communicate with any number of viewer systems, such as viewer systems 104a and 104b in FIG. 1. For example, communication interface 306 may be an interface that enables communications over a packet switched network, such as a local area network (LAN), a wide area network (WAN), a personal area network (PAN), or a combination of communication networks, such as the Internet. In such embodiments, communication interface 306 may any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, etc. In another embodiment, communication interface 306 may be an interface with a cable/fiber network for transmission of video data according to cable communication techniques/standards (e.g., quadrature amplitude modulation (QAM), data over cable service interface specification (DOCSIS), etc.). In such embodiments, communication interface 306 may include an analog and/or digital cable interface. Communication interface 306 may receive requests from viewer systems for media content, such as a request 334, and may transmit one or more media streams to viewer systems, such as media stream 338.

Cast group manager 308 is configured to manage cast groups, such as multicast groups, for media source 300. For example, cast group manager 308 may receive requests for media streams from viewer systems, such as request 334 (via communication interface 306), and may generate new multicast groups, may add viewers systems to existing multicast groups, and may remove viewer systems from multicast groups to satisfy the requests. Each cast group (e.g., unicast or multicast) is associated with a corresponding media stream generated by media stream generator 310. Cast group manager 308 may store multicast group tracking information, such as a list of member viewer systems of each multicast group, and may store tracking information for viewer systems that are not in multicast groups (e.g., that receive unicast media streams). Such tracking information may be maintained in a data structure (e.g., a file, table, array, etc.) in a memory device or other storage associated with media source 300, such as storage 302. When cast group manager 308 determines that a new media stream is to be generated, and a corresponding new cast group (e.g., unicast or multicast group) is needed (due to one or more received requests for media content), cast group manager 308 may generate a media stream request 340 for media stream generator 310 to construct the new media stream to be transmitted to members of the new cast group.

As shown in FIG. 3, 3D media content 322 includes a media product 324, which includes first-fourth view data 326, 328, 330, and 332 (and optionally further view data). Media product 324 contains 3D content (e.g., is a 3D video file, a 3D video stream, etc.), having multiple perspective views. Each of first-fourth view data 326, 328, 330, and 332 is representative of one of first-fourth perspective views of media product 324. View data of media product 324 may be delivered to viewer devices by media source 300 so that the corresponding perspective views may be displayed. Any number of media products 324 may be stored in storage 302. In embodiments, media product 324 may be stored in compressed or non-compressed form. For instance, media product 324 may be compressed according to a video compression standard such as MPEG-1, MPEG-2, MPEG-4, H.261, H.262, H.263, H.264, etc.

Media stream generator 310 is configured to generate media streams to be transmitted by communication interface 306 to viewer systems. Media stream generator 310 may generate a media stream corresponding to each unicast and/or multicast group tracked by cast group manager 308. For instance, media stream generator 310 may receive media stream requests 340 from cast group manager 308, and may generate media streams that each include corresponding portions of 3D media content 322 (e.g., that each include one or more of first-fourth view data 326, 328, 330, and 332) in response. Furthermore, each media stream may be modified in other ways by media stream generator 310 according to requests 340, including by modifying a resolution, color scheme, aspect ratio, etc., to meet display screen characteristics for viewer systems to receive the media stream.

For instance, as described above, media stream generator 310 includes a decoder 312, a view selector 314, a view adjustor 316, and an encoder 318. When media product 324 is stored in storage 302 in compressed form, decoder 312 may be present to decode a portion or the entirety of media product 324. For instance, decoder 312 may be configured to decode media content compressed according to a video compression standard such as MPEG-1, MPEG-2, MPEG-4, H.261, H.262, H.263, H.264, etc. Decoder 312 may be configured to decode media product 324 to generate decoded media content in any manner, as would be known to persons skilled in the relevant art(s). The decoded media content may include first-fourth view data 326, 328, 330, and 332 corresponding to the first-fourth perspective views (and optionally further view data and corresponding perspective views), which may have any form, including the form of frame sequences. Each frame sequence includes a plurality of frames, with each frame including one or more arrays of pixel data (e.g., arrays corresponding to different colors, such as RGB (red-green-blue), etc.) for display as a portion or entirety of a display screen.

View selector 314 is configured to extract view data from media product 324 corresponding to the perspective views indicated in media stream request 340 to be used to form a media stream. For instance, any one or more of the decoded versions of first-view data 326, 328, 330, and 332 may be extracted by view selector 314 from the decoded version of media product 324. View selector 314 may identify view data to be extracted by frame header information (e.g., by frame sequence identifier in a frame header for each frame) and/or in other manner. View selector 314 may perform such extraction in a continuous basis (by extracting frames from a continuous stream of frame sequences from storage 302 or other content source) to enable a media stream to be formed. When data for multiple perspective views is extracted from media product 324, view selector 314 may be configured to provide the extracted view data frames in an interleaved arrangement (e.g., leaving the extracted frames in a frame order that is the same as the order in which they are extracted from media product 324). Further examples of the selective decoding and/or encoding of media products and media streams, which may be received from storage 302 and/or communication interface 306, is provided in U.S. patent application Ser. No. 12/982,053, titled "Hierarchical Video Compression Supporting Selective Delivery of Two-Dimensional and Three-Dimensional Video Content," filed on same date herewith, which is incorporated by reference herein in its entirety.

View adjustor 316 is optionally present to adjust frames included in media streams to meet display requirements/characteristics for viewer system to receive the media streams. In embodiments, view adjustor 316 may perform one or more corresponding modification operations on the decoded frames. For example, view adjustor 316 may be configured to reduce a resolution of frames of one or more frame sequences to produce one or more corresponding reduced resolution frame sequences. For example, in an embodiment, view adjustor 316 may use techniques of image scaling to modify each frame of frame sequences to have a desired display pixel resolution for one or more destination viewer systems. For instance, view adjustor 316 may use upsampling or interpolating to increase resolution, and may use subsampling or downsampling to decrease resolution. View adjustor 316 may be optionally configured to modify color schemes (e.g., reduce a number of available pixel colors) for decoded frames. Furthermore, view adjustor 316 may be configured to crop frames of one or more frame sequences of the decoded frames to produce one or more corresponding cropped frame sequences. The cropped frames of the cropped frame sequence(s) have different aspect ratios (e.g., reduced heights and/or widths). View adjustor 316 may crop frames of frame sequences to have desired display aspect ratios for one or more destination viewer systems. For example, in an embodiment, view adjustor 316 may crop pixels from frames (e.g., by removing the corresponding pixel data from the corresponding frame data) to convert frames from a high definition format (e.g., 16:9 aspect ratio) to a standard format (e.g., a 4:3 aspect ratio), to convert frames from a movie theater format (e.g., 1.85:1 or 2.39:1 aspect ratio) to a high definition or standard format, and/or to convert frames to other sizes/aspect ratios. Techniques for cropping that may be used by view adjustor 316 are well known to persons skilled in the relevant art(s).

Encoder 318 is configured to encode the view data extracted by view selector 314 (and optionally adjusted by view adjustor 314) to generate an encoded media stream. The encoded media stream includes view data corresponding to one or more perspective views (e.g., one or more of first-view data 326, 328, 330, and 332) in encoded form. Encoder 318 may generate the media stream as compressed video content in a manner as would be known to persons skilled in the relevant art(s) according to any compression technique described elsewhere herein or otherwise known, such as MPEG-1, MPEG-2, MPEG-4, H.261, H.262, H.263, H.264, etc. For example, in one embodiment, encoder 318 may generate the encoded media stream to include whole frame data for each set of view data extracted by view selector 314.

In another embodiment, encoder 318 may designate one or more sets of the extracted view data to include reference frame data for reference frames, and may generate difference information for one or more other sets of the extracted view data. In embodiments, video content may be transmitted in a compressed form of a base "reference frame" sequence and difference information (e.g., in a difference file) that is used to define other frame sequences of the video content stream. The difference information may include information that indicates which frame sequences are to be generated based on the reference frame, and includes information to be used to modify the reference frame to generate one or more frames of the video content stream. The additional frames may be frames in a same frame sequence (e.g., a frame sequence for a same perspective view) as the reference frame, or frames in other frame sequences (e.g., frame sequences for other perspective views). Furthermore, more than one base reference frame may be present that is used to generate one or more other frames using included difference information. As such, encoder 318 may encode/compress the extracted view data by including some view data (e.g., one or more of first-view data 326, 328, 330, and 332) designated as reference frames/frame sequences, and by including some other view data (e.g., others of first-view data 326, 328, 330, and 332) in the form of difference information, such that their frame sequences may be generated (at viewer systems) by combining the difference information with the reference frames/frame sequences.

As shown in FIG. 310, media stream generator 310 transmits a media stream 338 generated according to media stream request 340, which is received at communication interface 306. Communication interface 306 is configured to transmit media stream 338 from media source 300 to one or more viewer systems (e.g., that provided request(s) 334) according to a communication protocol or scheme as described elsewhere herein or otherwise known. For example, as shown in FIG. 3, cast group manager 308 generates a cast instruction 336 that is received by communication interface 306. Cast instruction 336 indicates one or more viewer systems designated to receive media stream 338 (e.g., that provided request (s) 334). Communication interface 306 receives cast instruction 336, and delivers media stream 338 to the one or more viewer systems indicated in cast instruction 336.

Figure 5:
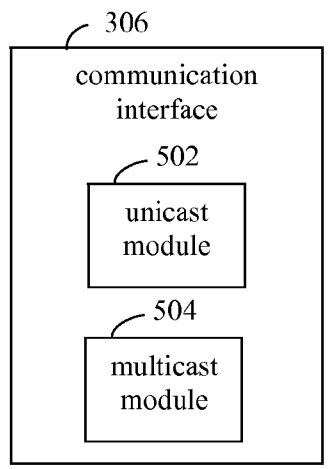
FIG. 5 shows a block diagram of a communication interface enabled to multicast and unicast media streams, according to an exemplary embodiment.

Communication interface 306 may transmit media streams to viewer systems in various ways. For instance, FIG. 5 shows a block diagram of communication interface 306 according to an exemplary embodiment. As shown in FIG. 5, communication interface 306 includes a unicast module 502 and a multicast module 504. Unicast module 502 is configured to enable communication interface 306 to communicate with viewer systems according to unicast, and multicast module 504 is configured to enable communication interface 306 to communicate with viewer systems according to multicast. "Unicast" refers to point-to-point communications, where data packets are transmitted from a source to a single destination. "Multicast" refers to communications where data packets are transmitted from a source to a plurality of destinations simultaneously. To communicate with multiple viewer systems using unicast, a separate communication is sent from the source to each destination. Multicast enables communications with multiple destinations while only transmitting a single communication from the source. Multicast delivers information to multiple destinations simultaneously in an efficient manner, such as by transmitting the information signal over any particular link only once, creating copies of the information signal only when the links to the destinations split (e.g., at switches or routers). As such, in embodiments, unicast module 502 handles media streams that have a single destination viewer system, and multicast module 504 handles media streams that have multiple destination viewer systems.

For example, cast instruction 336 may indicate a single viewer system to which media stream 338 is to be transmitted. In such case, unicast module 502 places communication interface 306 in a unicast mode for media stream 338, and communication interface 306 transmits media stream 338 to the viewer system according to unicast. Alternatively, cast instruction 336 may indicate multiple viewer systems to which media stream 338 is to be transmitted. For example, cast instruction 336 may provide a list of viewer systems in cast instruction 336 as a multicast group. In such case, multicast module 504 may place communication interface 306 in a multicast mode for media stream 338, and communication interface 306 may transmit media stream 338 according to multicast. For example, each data packet of media stream 338 may be formed to include a list of network addresses (e.g., IP addresses, etc.) for the viewer systems in the multicast group. The data packets are transmitted from communication interface 306 one time each, and network nodes that receive the data packets may forward the data packets toward the destination viewer systems, replicating the data packets as needed when the communication pathway to different viewer systems splits or forks. In other embodiments, other techniques for multicast may be enabled by multicast module 504. For instance, in an embodiment, multicast module 504 may be configured to perform IP multicast, where the destination viewer systems are added to a multicast group having an IP multicast address, and a multicast distribution tree is generated for the multicast group.

Viewer system 400 is described as follows. As shown in FIG. 4, viewer system 400 includes a communication interface 402, a user interface 404, an interface circuitry 408, a screen assembly 410, storage 412, and a media stream combiner 426. Media stream combiner 426 is configured to process media streams, and to combine media streams to produce media content for display when multiple media streams that include portions of the media content are received. Media stream combiner 426 includes processing circuitry 406. Processing circuitry 406 includes a decoder 414, a multisource weaver 416, a view adjustor 418, and a display driver 420. These features of viewer system 400 are described as follows.

Communication interface 402 interfaces viewer system 400 with a communication network, such as communication network 106 of FIG. 1, to be enabled to communicate with any number of media sources, such as media source 102 in FIG. 1 and/or media source 300 in FIG. 3. For example, communication interface 402 may be an interface that enables communications over a packet switched network, such as a local area network (LAN), a wide area network (WAN), a personal area network (PAN), or a combination of communication networks, such as the Internet, a cable-fiber network, etc. In embodiments, communication interface 402 may be configured to communicate over any of the network types described above for communication interface 306 (FIG. 3) and/or other network types.

As shown in FIG. 4, communication interface 402 may transmit request 334 from viewer system 400 as a request for media content to be displayed by a display screen of screen assembly 410 of viewer system 400. For example, request 334 may be initiated in an automatic manner, or may be initiated by a user interacting with user interface 404 of viewer system 400. User interface 404 may include one or more interface mechanisms with which a user can interact with to use viewer system 400, including requesting media content for display. For instance, user interface 404 may include one or more of a graphical user interface (GUI), a mouse/pointing device to move a displayed pointer/cursor, a keyboard, a thumb wheel or other wheel, a roller ball, a stick pointer, a touch sensitive display, any number of virtual interface elements (e.g., such as a keyboard or other user interface element displayed by a screen), a voice recognition system, and/or other user interface elements described elsewhere herein or otherwise known to provide user input. Alternatively, user interface 404 may be a communication interface for a remote device (e.g., a handheld remote control, a headset, etc.) to provide user input. A user may select media content for display at viewer system 400 in any manner, including by selecting a video, a movie, a television show, etc., from a menu of content, or in other manner. In response to the selection, user interface 404 generates request 334. As shown in FIG. 4, communication interface 402 receives request 334, and delivers request 334 to a media source.

As shown in FIG. 4, in response to request 334, communication interface 402 of viewer system 400 may receive one or more media streams 338, such as media streams 338a and 338b shown in FIG. 4. The received media stream(s) 338 is/are forwarded to processing circuitry 406. Media stream combiner 426 is configured to process the received media stream(s) 338 for display by screen assembly 410. For instance, as described above, processing circuitry 406 of media stream combiner 426 may include decoder 414, multisource weaver 416, view adjustor 418, and display driver 420. When a media stream 338 is received in compressed form, decoder 414 may be present to decode a portion or the entirety of media stream 338. For instance, decoder 414 may be configured to decode media content compressed according to a video compression standard such as MPEG-1, MPEG-2, MPEG-4, H.261, H.262, H.263, H.264, etc. Decoder 414 may be configured to decode media stream 338 to generate a decoded media stream in any manner, as would be known to persons skilled in the relevant art(s). The decoded media stream may include data representative of any number of perspective views (e.g., camera perspectives), depending on the media content requested. For instance, referring to media product 324 of FIG. 3, media stream 338 may include one or more of first-fourth view data 326, 328, 330, and 332 that are representative of the first-fourth perspective views (and optionally further view data and corresponding perspective views). The decoded media stream may have any form, including the form of frame sequences.

Multisource weaver 416 is configured to combine frame sequences received in two or more separate media streams 338 into a single media stream that may be displayed by a screen of screen assembly 410. For example, multisource weaver 416 may weave together (e.g., alternate) frames of two received frame sequences (e.g., first view data 326 and second view data 328 of FIG. 3 received in first and second media streams 338a and 338b, respectively) into a single output video content stream to be viewed as three-dimensional content. In another example, multisource weaver 416 may receive first and second pairs of frame sequences (e.g., first and second view data 326 and 328, and third and fourth view data 330 and 322, received as two separate 3D media streams), and may weave together (e.g., interleave) the frames of the first and second pairs into a single video content stream to be viewable as 3D-4 content. Any number of received frame sequences may be woven by multisource weaver 416 to form a single video content stream having a number of frame sequences (perspective views) equal to the number of received frame sequences.

Weaving instructions may be provided to multisource weaver 416 in one or more of the media streams to be combined. For instance, weaving instructions may be included in one or more headers of frames of one or more of the received frame sequences that indicates which frames sequences/media streams are to be woven together and in what order. Alternatively, such weaving instructions may be provided from the media source to multisource weaver 416 in a signal that is separate from the media streams.

In an embodiment where reference frame sequences and one or more difference files are received in media stream(s) 338, and are decoded by decoder 414, multisource weaver 416 may be configured to generate one or more frame sequences based on the decoded reference frame sequences and difference file(s), and to combine the reference frame sequences and generated frame sequence(s) to form a single media stream for display.

View adjustor 418 is optionally present. In embodiments, view adjustor 418 may perform one or more corresponding modification operations on the decoded received media stream(s) prior to or after being combined by multisource weaver 416 (if multiple media streams are received). For example, view adjustor 418 may be configured to reduce a resolution of frames of one or more frame sequences in the decoded media stream(s) to produce one or more corresponding reduced resolution frame sequences. For example, in an embodiment, view adjustor 418 may use techniques of image scaling to modify each frame of frame sequences having an unsupported display pixel resolution to a supported display pixel resolution, or so that different resolutions of received media streams match each other. For instance, view adjustor 418 may use upsampling or interpolating to increase resolution, and may use subsampling or downsampling to decrease resolution. View adjustor 418 may be optionally configured to modify color schemes (e.g., reduce a number of available pixel colors) for decoded media stream(s). Furthermore, view adjustor 418 may be configured to crop frames of one or more frame sequences included in received media streams to produce one or more corresponding cropped frame sequences. The cropped frames of the cropped frame sequence(s) have different aspect ratios (e.g., reduced heights and/or widths) from the corresponding frames of the one or more frame sequences included in the decoded media stream(s). View adjustor 418 may crop frames of frame sequences having unsupported display aspect ratios so that each frame has a desired/supported display aspect ratio, and/or so that different aspect ratios of received media streams match each other. For example, in an embodiment, view adjustor 418 may crop pixels from frames (e.g., by removing the corresponding pixel data from the corresponding frame data) to convert frames from a high definition format (e.g., 16:9 aspect ratio) to a standard format (e.g., a 4:3 aspect ratio), to convert frames from a movie theater format (e.g., 1.85:1 or 2.39:1 aspect ratio) to a high definition or standard format, and/or to convert frames to other sizes/aspect ratios. Techniques for cropping that may be used by view adjustor 418 are well known to persons skilled in the relevant art(s).

Display driver 420 is configured to generate drive signals 422 to establish a communication flow toward screen assembly 410 of the decoded (and optionally woven and/or adjusted) frame sequences of the received media stream(s) to be displayed at screen assembly 410. Multiple display drivers 420 may be present, and each display driver 420 is typically display device-specific, although some display drivers 420 may be capable of driving multiple types of display devices. Example types of display driver 420 include a 2D only driver variant, a 3Dx only driver variant, and a mixed 2D and 3Dx driver variant. For instance, when a 2D display is present that enables only 2D content to be displayed, the 2D only driver variant may be used. When a 3D enabled display is present, but does not have regional display capability, the 3Dx only driver variant may be used. When a 3D enabled display with regional display capability is present, the mixed 2D and 3Dx driver variant may be used.

As shown in FIG. 4, drive signals 422 are received by interface circuitry 408, which is optionally present. In an embodiment, if screen assembly 410 and processing circuitry 406 are contained in a common housing/structure, interface circuitry 408 may or may not be needed to be present. If screen assembly 410 and processing circuitry 406 are in a separate housing/structure, interface circuitry 408 may be present to provide an interface. For instance, processing circuitry 406 may be in a game console, a desktop computer tower, a home audio receiver, a set top box, etc., and screen assembly 410 may be included in a display device structure. In such case, interface circuitry 408 may need to be present. When present, interface circuitry 408 may include circuitry, such as receivers and/or transmitters (wired or wireless), for enabling communications between processing circuitry 406 and screen assembly 410. When present, interface circuitry 408 provides drive signals 424 based on drive signals 422 (e.g., generates and/or forwards drive signals 422).

Screen assembly 410 receives drive signals 424, and displays the media content corresponding to received media stream(s) 338 on a display screen. Examples of display screens for screen assembly 410 are described elsewhere herein, including fixed and adaptable display screens.

Note that storage 412 is optionally present. Storage 412 may be used to store one or more received media streams 338 by processing circuitry 406. For example, storage 412 may store media streams 338 prior to decoding and/or combination, and may store the decoded and/or combined media stream versions prior to being displayed at screen assembly 410. For instance, storage 412 may operate as a buffer and/or may function as short or long term storage. Example types of storage for storage 412 (e.g., memory devices, hard drives, etc.) are described elsewhere herein.

Thus, viewer system 400 may request media content and may receive one or more media streams 338 in response. If a single media stream 338 is received, the single media stream 338 may be decoded by decoder 414, optionally adjusted by view adjustor 418, and delivered to screen assembly 410 by display driver 420 and interface circuitry 408 (when present). If multiple media streams 338 are received, the media streams 338 may each be decoded by decoder 414, combined by multisource weaver 416 to form a single decoded media stream, optionally adjusted by view adjustor 418, and delivered to screen assembly 410 by display driver 420 and interface circuitry 408 (when present).

Figure 6:
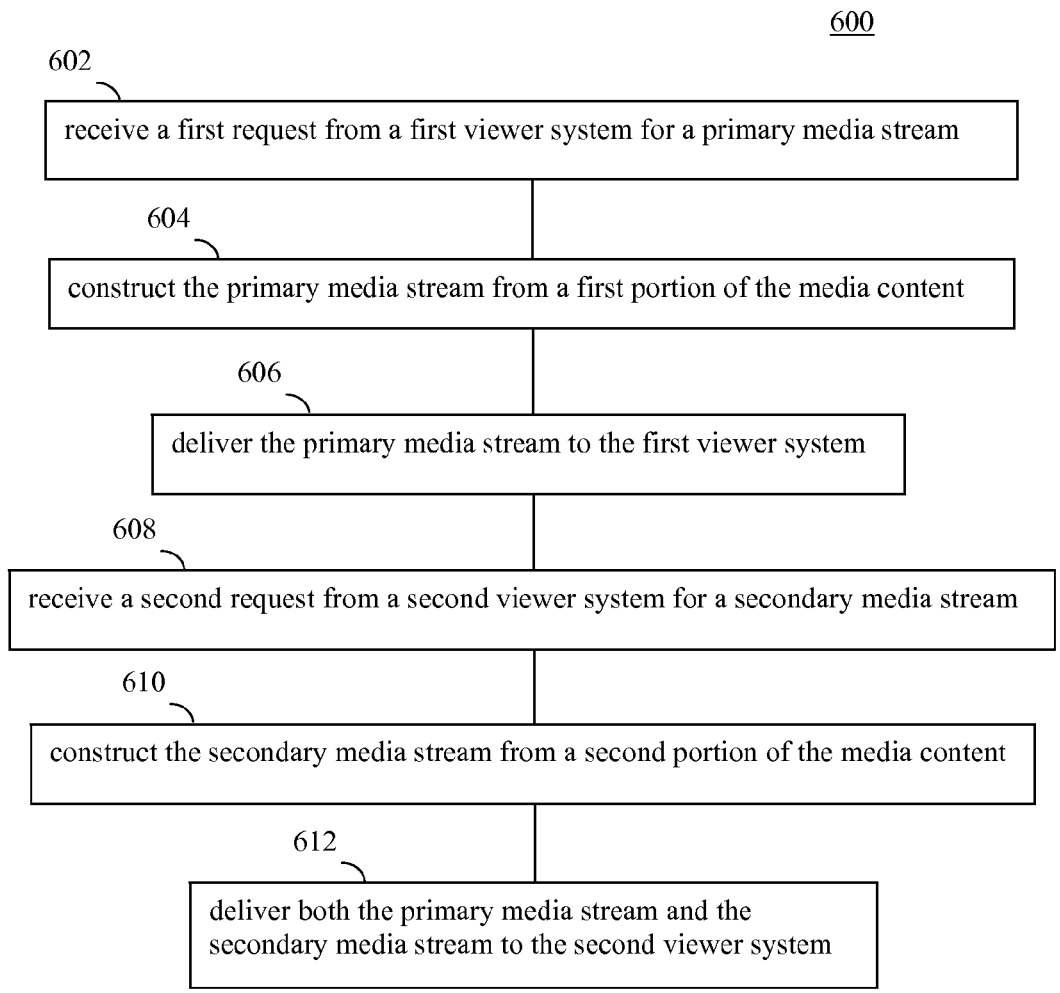
FIG. 6 shows a flowchart providing a process for delivering media content in multiple media streams to multiple viewer systems, according to an exemplary embodiment.

FIG. 6 shows a flowchart 600 providing a process for delivering media content in multiple media streams to multiple viewer systems, according to an exemplary embodiment. Flowchart 600 may be performed by media source 300 of FIG. 3, in an exemplary embodiment. Further structural and operational embodiments will be apparent to persons skilled in the relevant art(s) based on the discussion regarding flowchart 600. Flowchart 600 is described as follows.

Flowchart 600 begins with step 602. In step 602, a first request is received from a first viewer system for a primary media stream. For example, referring to FIG. 3, media source 300 receives a first request 334 from a viewer system, such as viewer system 104a in FIG. 1. First request 334 from viewer system 104a may be a request for a first media content based on media product 324 to be delivered in a first media stream to viewer system 104a.

In step 604, the primary media stream is constructed from a first portion of the media content. As described above, media stream generator 310 may construct a media stream corresponding to first request 334. Cast group manager 308 may determine whether a media stream corresponding to first request 334 already is being delivered by media source 300 to one or more other viewer systems. If such a media stream is already being delivered, cast group manager 308 may add viewer system 104a to a multicast group for the already existing media stream. If such a media stream is not already being delivered, cast group manager 308 may generate media stream request 340 to request media stream generator 310 to generate the media stream. Media stream generator 310 may generate the media stream from one or more of first-fourth view data 326, 328, 330, and 332, which are representations of camera perspectives of the requested media content. Media stream generator 310 outputs the generated media stream as first media stream 338.

In step 606, the primary media stream is delivered to the first viewer system. For example, as shown in FIG. 3, communication interface 306 delivers first media stream 338 to the requesting viewer system (e.g., viewer system 104a). Cast group manager 308 provides cast group instruction 336 to communication interface 306 to indicate whether first media stream 338 is to be unicast to viewer system 104a, or to be multicast to a multicast group that includes viewer system 104a. For example, as shown in FIG. 1, media source 102 delivers a first media stream 114 to first viewer system 104a.

In step 608, a second request is received from a second viewer system for a secondary media stream. Referring to FIG. 3, media source 300 may receive a second request 334 from a viewer system, such as viewer system 104b in FIG. 1. Second request 334 from viewer system 104b may be a request for a second media content based on media product 324 to be delivered in a second media stream to viewer system 104b. The second media content include one or more perspective views (camera views) of media product 324 that are not included in first media content delivered to viewer system 104a in first media stream 338.

In step 610, the secondary media stream is constructed from a second portion of the media content. For instance, media stream generator 310 may construct a media stream corresponding to the second request 334. Cast group manager 308 may determine that a portion of the views requested in second request 334 are already being delivered at least to first viewer system 104a in the first media stream 338. As such, cast group manager 308 may generate a media stream request 340 to request media stream generator 310 to generate a second media stream to deliver the perspective views needed to fulfill second request 334 that are not already being delivered in the first media stream 338 (first media stream 114 of FIG. 1). Media stream generator 310 may generate the second media stream from the one or more of the perspective views represented by first-fourth view data 326, 328, 330, and 332 indicated in media stream request 340. Media stream generator 310 outputs the generated media stream as a second media stream 338.

In step 612, both the primary media stream and the secondary media stream are delivered to the second viewer system. For example, as shown in FIG. 3, cast group manager 308 provides cast group instruction 336 to communication interface 306 adding second viewer system 104b to a multicast group that at least includes first viewer system 104a for receiving first media stream 338. Cast group instruction 336 also indicates that the second media stream 338 is to be received by second viewer system 104b (either by unicast or a multicast group). As a result, communication interface 306 delivers the first media stream 338 to first and second viewer systems 104a and 104b, and the second media stream 338 to second viewer system 104b. For example, as shown in FIG. 1, media source 102 delivers first media stream 114 to first and second viewer systems 104a and 104b, and second media stream 118 to second viewer system 104b. As shown in FIG. 3, viewer system 400 receives first and second media streams 338a and 338b.

First viewer system 104b may display the camera views represented by the view data received in first media stream 338 (first media stream 114). Furthermore, second viewer system 104b may combine the view data received in first and second media streams 114 and 118 (e.g., media streams 338a and 338b), and may display the combined view data. For instance, second viewer system 104b may combine the view data according to step 216 of flowchart 210 in FIG. 2B, using multisource weaver 416 of processing circuitry 406 in FIG. 4.

Thus, in this example, resources of media source 300 and communication bandwidth are conserved, because the media source 300 only need deliver view data for the perspective views requested by first and second viewer systems 104a and 104b once, even though some common view data is requested by both. The view data requested by both of first and second viewer systems 104a and 104b is multicast, and thus is replicated during delivery to first and second viewer systems 104a and 104b, rather than being delivered twice by media source 300.

For instance, in one example, first request 334 from first viewer system 104a may be a request for a 2D version of media product 324, and second request 334 from second viewer system 104b may be a request for a stereoscopic 3D version of media product 324. In such an example, media source 300 may deliver first view data 326 in a first media stream 338 (e.g., first media stream 114 of FIG. 1) that is received by both of first and second viewer systems 104a and 104b. Furthermore, media source 300 may deliver second view data 328 in a second media stream 338 (e.g., second media stream 118 of FIG. 1) that is received by second viewer system 104b.

Figure 7:
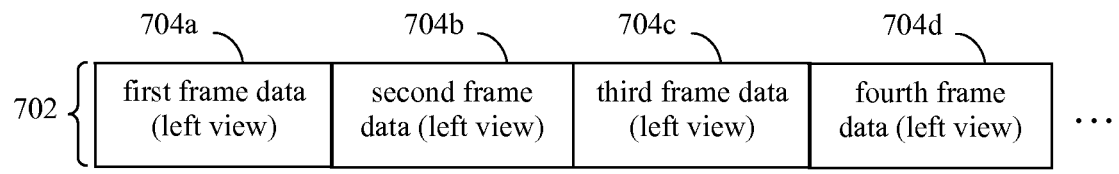
FIG. 7 shows a block diagram representation of a media stream that includes a frame sequence for a single perspective view, according to an exemplary embodiment.

For example, FIG. 7 shows a block diagram representation of a media stream 702, according to an exemplary embodiment. As shown in FIG. 7, media stream 702 includes a frame sequence 504. Frame sequence 504 includes view data in the form of a plurality of frames (e.g., frames 504a, 504b, etc.) providing a single perspective view (camera view). First view data 326 included in first media stream 114 may have the structure of media stream 702, and second view data 328 included in second media stream 118 may have the structure of media stream 702.

Figure 8:
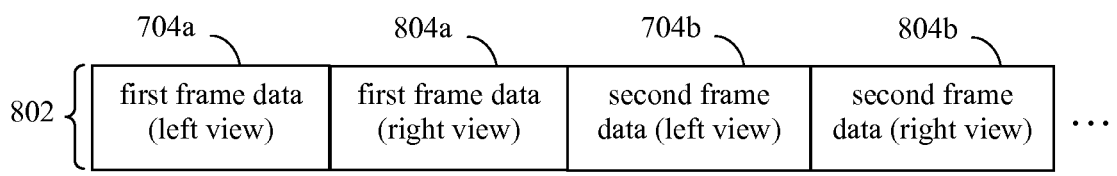
FIG. 8 shows a block diagram representation of a media stream that includes frame sequences for first and second perspective views that form a three-dimensional view, according to an exemplary embodiment.

As described above, first and second media streams 114 and 118 may be combined in second viewer system 118. For instance, FIG. 8 shows a block diagram representation of a 3D media stream 802, according to an exemplary embodiment. As shown in FIG. 8, 3D media stream 802 includes a first frame sequence 704 and a second frame sequence 804. First frame sequence 704 includes first view data in the form of a first plurality of frames (e.g., frames 704a, 704b, etc.) providing a first perspective view (e.g., a left eye view). Second frame sequence 704 includes second view data in the form of a second plurality of frames (e.g., frames 804a, 804b, etc.) providing a second perspective view (e.g., a right eye view). 3D media stream 802 is an example of first and second view data 326 and 238 having been combined in second viewer system 104b (e.g., by processing circuitry 406 of FIG. 4) to be displayed by a display screen. As shown in FIG. 8, frames of first frame sequence 704 corresponding to first view data 326 alternate with frames of second frame sequence 804 corresponding to second view data 328. A first frame 704a may be first received and displayed by a display screen to show a first left image, first frame 804a may be next received and displayed by the display screen to show a first right image (e.g., simultaneously with first frame 704a), second frame 704b may be next received and displayed by the display screen to show a second left image, second frame 804b may be next received and displayed by the display screen to show a second right image (e.g., simultaneously with second frame 704b), etc. In this manner, viewers perceive a three-dimensional video being displayed.

For instance, in another example, first request 334 from first viewer system 104a may be a request for a stereoscopic 3D version of media product 324, and second request 334 from second viewer system 104b may be a request for a 3D-4 multiview version of media product 324. In such an example, media source 300 may deliver first and second view data 326 and 328 in a first media stream 338 (e.g., first media stream 114 of FIG. 1) that is received by both of first and second viewer systems 104a and 104b. Furthermore, media source 300 may deliver third and fourth view data 330 and 332 in a second media stream 338 (e.g., second media stream 118 of FIG. 1) that is received by second viewer system 104b. First and second media streams 114 and 118 may be combined in second viewer system 118 to form the 3D-4 multiview version of media product 324.

Figure 9:
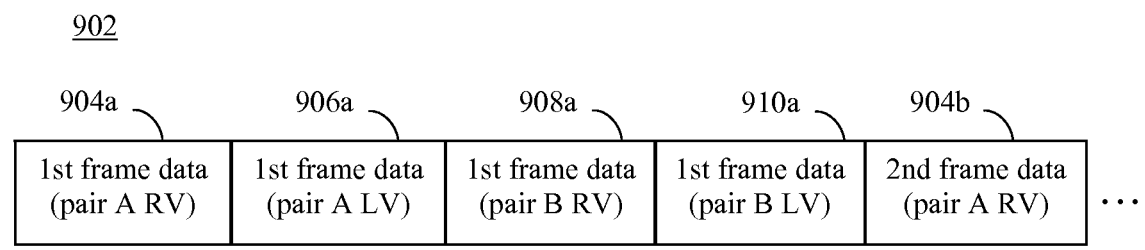
FIG. 9 shows a block diagram representation of a media stream that includes frame sequences for first and second pairs of perspective views, according to an exemplary embodiment.

For instance, FIG. 9 shows a block diagram representation of a 3D-4 multiview media stream 902, according to an exemplary embodiment. 3D-4 multiview media stream 902 may be generated by processing circuitry 406 of viewer system 104b by combining first and second media streams 114 and 118. Media stream 902 includes multiple pairs of frame sequences corresponding to first-fourth view data 326, 328, 330, and 332, and representative of two pairs of right and left eye perspective views. As shown in FIG. 9, media stream 902 includes a first-fourth frame sequences 904, 906, 908, and 910. Each frame sequence includes data in the form of a plurality of frames. First and second frame sequences 904 and 906 are a first pair of frame sequences corresponding to a first pair ("pair A") of right and left eye perspective views (first and second view data 326 and 328), and frame sequences 908 and 910 are a second pair of frame sequences corresponding to a second pair ("pair B") of right and left eye perspective views (third and fourth view data 330 and 332). For the first pair, first frame sequence 904 includes frames 904a, 904b, etc. providing a first perspective view (e.g., a left eye view), and second frame sequence 906 includes frames 906a, 906b, etc. providing a second perspective view (e.g., a right eye view). Furthermore, for the second pair, third frame sequence 908 includes frames 908a, 908b, etc. providing a first perspective view (e.g., a left eye view), and second frame sequence 910 includes frames 910a, 910b, etc. providing a second perspective view (e.g., a right eye view). As shown in FIG. 9, frames of first frame sequence 904, second frame sequence 906, third frame sequence 908, and fourth frame sequence 910 alternate in sequence.

In further embodiments, any number of perspective views may be delivered in any number of media streams by media source 300, and combined in viewer system 400, to be displayed by a display screen.

Note that in some cases, a second (or subsequent) request for a second version of a media product may be delivered to a media source later in time than when a first request for a first version of the media product is received by the media source. A first media stream may be delivered in response to the first request to a first viewer system, and the first media stream and a second media stream may be delivered to a second viewer system in response to the second request. If the media source has previously transmitted some part of the media product in the first media stream (e.g., a first part), the second viewer system may not have all of the view data that is needed to construct a combined media stream. This is because at least a first part of the first media stream had already been transmitted by the media source before it was requested and received by the second viewer system. In such case, the media source may deliver the portion of the first media stream that had been earlier transmitted to the second viewer system so that the second viewer system is enabled to construct the requested version of the media product from the beginning. For example, in an embodiment, prior content retriever 320 shown in FIG. 3 may be configured to deliver a tertiary media stream to the second viewer system based on the first part of the primary media stream.

Figure 10:
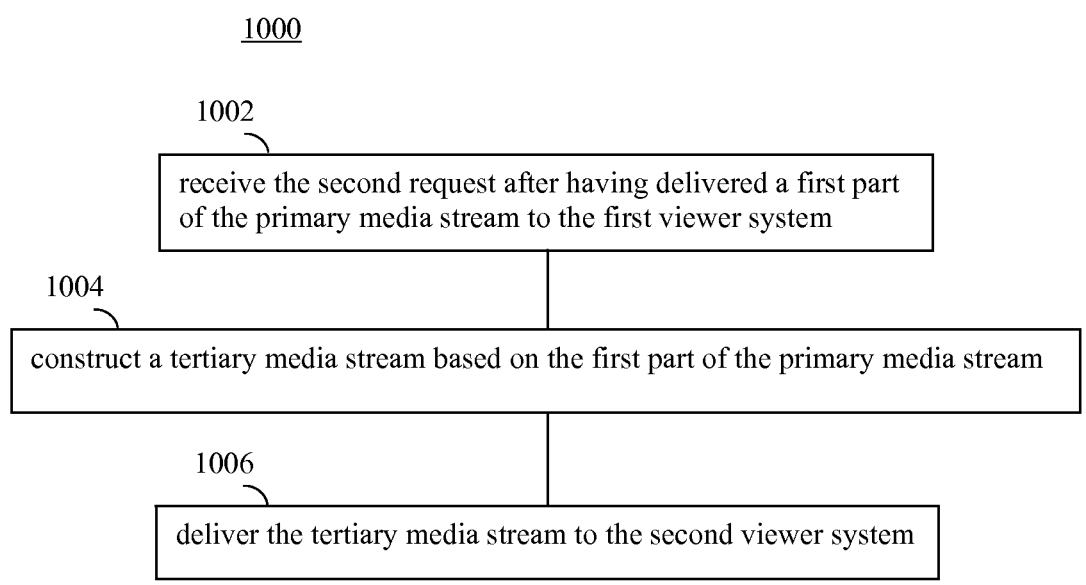
FIG. 10 shows a flowchart providing a process for delivering a third media stream to a viewer system to provide media content previously delivered in one or more other media streams not received by the viewer system, according to an exemplary embodiment.

For instance, FIG. 10 shows a flowchart 1000 providing a process for delivering a tertiary media stream to enable a media stream to be constructed, according to an exemplary embodiment. Flowchart 1000 may be performed by media source 300 of FIG. 3, in an exemplary embodiment. Further structural and operational embodiments will be apparent to persons skilled in the relevant art(s) based on the discussion regarding flowchart 1000. Flowchart 1000 is described as follows.

Flowchart 1000 begins with step 1002. In step 1002, the second request is received after having delivered a first part of the primary media stream to the first viewer system. For example, as described above with respect to flowchart 600 (FIG. 6), in step 608, a request is received from a second viewer system for a secondary media stream. Step 608 may occur after steps 602-606, where a request for a primary media stream is requested, and the primary media stream is constructed and delivered to a first viewer system. As such, a first part of the primary media stream has been delivered prior to the second request being received from the second viewer system. Therefore, the first part of the primary media stream may need to be delivered to the second viewer system, particularly if the media content is a movie, television show, or other video content that viewers at the second viewer system may want to view from the beginning.

In step 1004, a tertiary media stream is constructed based on the first part of the primary media stream. For example, referring to FIG. 3, second request 334 may be received via communication interface 306 by cast group manager 308. As described above with respect to flowchart 600 (FIG. 6), in step 610, cast group manager 308 may instruct media stream generator 310 to generate a second media stream to be delivered to the second viewer system that includes the views of media product 324 not included in the first media stream. Furthermore, according to step 1004, cast group manager 308 may instruct media stream generator 310 in a same or different media stream request 340 to generate a third media stream that includes a first part of media product 324 that was provided to the first viewer system in the primary media stream, but was not provided to the second viewer system, that includes all views of the content of media product 324 corresponding to the version of media product 324 requested by the second viewer system in second request 334. Prior content retriever 320 responds to media stream request 340 by retrieving the requested views (e.g., two or more of first-fourth view data 326, 328, 330, and 332) of media product 324 from storage 302. Thus, if second request 334 is a request for a stereoscopic 3D version of media product 324, prior content retriever 320 retrieves first and second view data 326 and 328, which represent first and second perspective views (camera views) of a 3D version of media product 324. If second request 334 is a request for a 3D-4 version of media product 324, prior content retriever 320 retrieves first-fourth view data 326, 328, 330, and 332, which represent first-fourth perspective views of a 3D-4 version of media product 324. If second request 334 is a request for a 3D-6 or further camera view version of media product 324, prior content retriever 320 retrieves all of the view data representing all of the perspective views of the requested version of media product 324.

Media stream generator 310 outputs the view data corresponding to the views retrieved by prior content retriever 320 as a third media stream 338. Note that optionally, decoder 312 may decode media product 324 so that prior content retriever 320 can retrieve the requested view data, and encoder 318 may encode the requested view data. View adjustor 316 may optionally adjust the requested view data, as described above.

In step 1006, the tertiary media stream is delivered to the second viewer system. For instance, as shown in FIG. 3, the third media stream 338 may be delivered by communication interface 306 to the second viewer system. The second viewer system may receive the first, second, and third media streams 338. Referring to FIG. 4, the third media stream 338 may be received (via communication interface 402), and processing circuitry 406 may decode (decoder 414) the third media stream, may optionally adjust (view adjustor 418) the third media stream, and may deliver (e.g., via display driver 420 and interface circuitry 408) the third media stream to screen assembly 410 for display. The first and second media streams 338 may optionally be stored (e.g. buffered) in storage 412, and may be combined by processing circuitry 406 as described above. The combined media stream may be displayed at screen assembly 410 after the media content of the third media stream is finished being displayed. In this manner, viewers of the screen of screen assembly 410 may view the requested version of media product 324 from the beginning.

Note that one or both of first and second viewer systems 104a and 104b may be removed from a multicast of a first media stream at some subsequent point in time. For example, viewers and one or both of first and second viewer systems 104a and 104b may discontinue watching the provided media content (e.g., may turn channels, stop a playing video, etc.), and therefore no longer be requesting the media content. Alternatively, one or both of first and second viewer systems 104a and 104b may be removed from a multicast of a media stream due to a difference between a first communication characteristic associated with first viewer system 104a and a second communication characteristic associated with the second viewer system 104b. For example, display of content at one or both of first and second viewer systems 104a and 104b may be paused, and in such case, if the display is continued later, it may be more efficient for the one or both of viewer systems 104a and 104b that paused their content to be moved to a different multicast group that is more in sync with their content display when the display of content is continued (un-paused). The media stream may continue to be multicast to both first viewer system 104a and second viewer system 104b if both the first communication characteristic of first viewer system 104*a* and the second communication characteristic of second viewer system 104*b* remain to be relatively similar (e.g., displaying the media content relatively in sync with each other).

In another example, one or both of viewer systems 104*a* and 104*b* may be removed from the multicast of the first media stream because they changed a viewing characteristic, such changing from watching a 2D version to a 3D version of media product 324, changing from watching a 3D version to a 2D version of media product 324, changing a display characteristic such as aspect ratio, color scheme, 3D type, resolution, a viewed subset of the multiple pairs of camera views provided by 3D multiview content (e.g., due to a viewer changing position in a viewing space) etc. In such case, the one or both of viewer systems 104*a* and 104*b* may be moved to a different multicast group (or a new unicast or multicast group) that matches their changed viewing characteristics.

C. Example Display Device Screen Embodiments

Embodiments are described herein for the delivering two-dimensional and three-dimensional content in one or more media streams that may be displayed by various types of displays. For example, some display screens are configured for displaying two-dimensional content, although they may display two-dimensional images that may be combined to form three-dimensional images by special glasses worn by users. Some other types of display screens are capable of display of two-dimensional content and three-dimensional content without the users having to wear special glasses using techniques of autostereoscopy. According to embodiments, display drivers may supply delivered content for display on a display screen. Example display devices and screens are described as follows.

As described above, display devices that display delivered content, such as screens of viewer systems 104*a* and 104*b*, a screen of screen assembly 410, etc., may be implemented in various ways. For instance, such a display device may be a television display (e.g., an LCD (liquid crystal display) television, a plasma television, etc.), a computer monitor, or any other type of display device. The display device may include any suitable type or combination of light and image generating devices, including an LCD screen, a plasma screen, an LED (light emitting device) screen (e.g., an OLED (organic LED) screen), etc. Furthermore, the display device may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, the display device may include any suitable light emitting device as backlighting, including a panel of LEDs or other light emitting elements.

Figure 11:
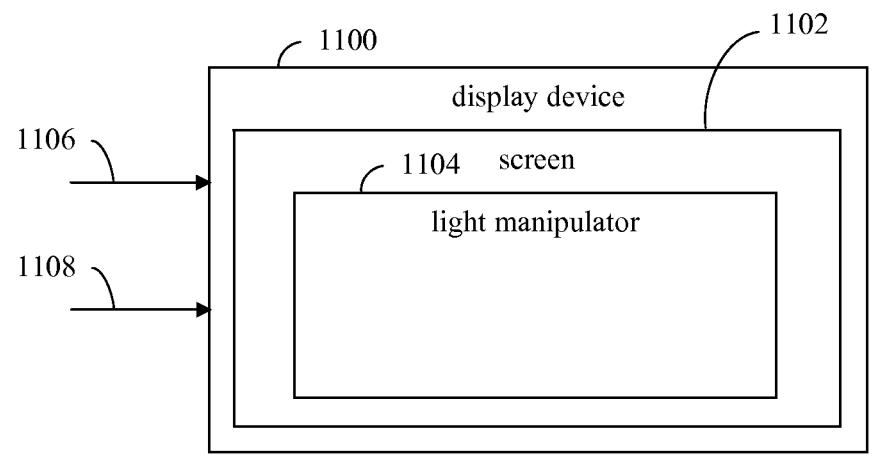
FIG. 11 shows a block diagram of a display device having a light manipulator that enables display of 3D content by a screen, according to an exemplary embodiment.

For instance, FIG. 11 shows a block diagram of a display device 1100, according to an exemplary embodiment. As shown in FIG. 11, display device 1100 includes a screen 1102. Display device 1100 is an example of a display of viewer systems 104*a*, 104*b*, and 400, and screen 1102 is an example of a screen of the display of viewer systems 104*a* and 104*b*, and a screen of screen assembly 410. Device 1100 receives one or more control signals 1106 (e.g., from processing circuitry described herein) that are configured to place screen 1102 in a desired display mode (e.g., either a two-dimensional display mode or a three-dimensional display mode). As shown in FIG. 11, screen 1102 includes a light manipulator 1104. Light manipulator 1104 is configured to manipulate light that passes through light manipulator 1104 to enable three-dimensional images to be delivered to users in a viewing space. For instance, control signal(s) 1106 may be configured to activate or deactivate light manipulator 1104 to place the screen in a three-dimensional display mode or a two-dimensional display mode, respectively.

Examples of light manipulator 1104 include a parallax barrier and a lenticular lens. For instance, light manipulator 1104 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 1104 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 11, display device 1100 receives a content signal 1108 (e.g., from a media device or other device mentioned elsewhere herein), such as second video content 114 of FIG. 1. Content signal 1108 includes two-dimensional or three-dimensional content for display by screen 1102, depending on the particular display mode. In the embodiment of FIG. 11, light manipulator 1104 is physically fixed—is not adaptable. As such, when present, light manipulator 1104 (e.g., a fixed parallax barrier or a fixed lenticular lens) always delivers three-dimensional images of a particular type to a particular region in a viewing space. As such, light manipulator 1104 is not adaptable to deliver other types of three-dimensional images and/or to deliver two and/or three-dimensional images to multiple different regions of a viewing space.

Figure 12:
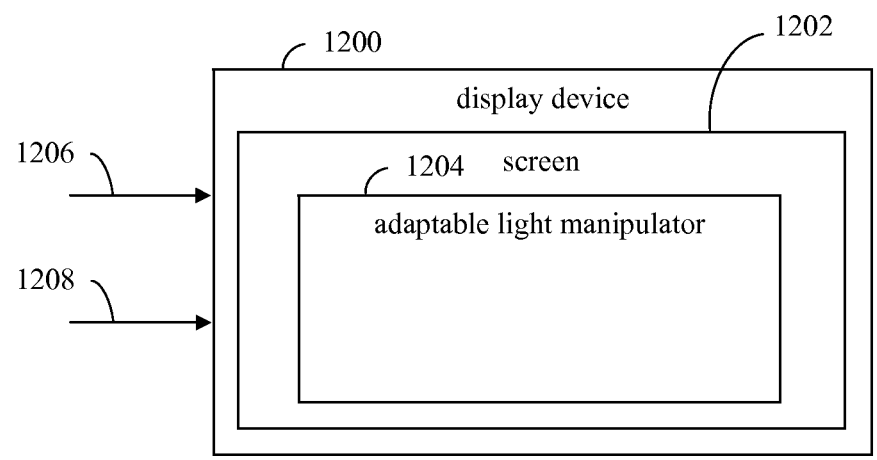
FIG. 12 shows a block diagram of a display device having an adaptable light manipulator that enables the adaptable display of 3D content by a screen, according to an exemplary embodiment.

In contrast, FIG. 12 shows a block diagram of a display device 1200 that is adaptable, according to an exemplary embodiment. As shown in FIG. 12, display device 1202 includes a screen 1202. Display device 1200 is an example of a display of viewer systems 104*a*, 104*b*, and 400, and screen 1202 is an example of a screen of the display of viewer systems 104*a* and 104*b*, and a screen of screen assembly 410. Furthermore, as shown in FIG. 12, screen 1202 includes an adaptable light manipulator 1204. Adaptable light manipulator 1204 is configured to manipulate light that passes through adaptable light manipulator 1204 to enable three-dimensional images to be delivered to users in a viewing space. Furthermore, adaptable light manipulator 1204 is adaptable—is not physically fixed in configuration. As such, adaptable light manipulator 1204 is adaptable to deliver multiple different types of three-dimensional images and/or to deliver three-dimensional images to different/moving regions of a viewing space. Furthermore, in an embodiment, different regions of adaptable light manipulator 1204 may be adaptable such that multiple two-dimensional and/or three-dimensional images may be simultaneously delivered by screen 1202 to the viewing space.

Display device 1200 receives one or more control signals 1206 (e.g., from processing circuitry) that are configured to place screen 1202 in a desired display mode (e.g., either a two-dimensional display mode or a three-dimensional display mode), and/or to configure three-dimensional characteristics of any number and type as described above, such as configuring adaptable light manipulator 1204 to deliver different types of three-dimensional images, to deliver three-dimensional images to different/moving regions of a viewing space, and to deliver two-dimensional and/or three-dimensional images from any number of regions of screen 1202 to the viewing space.

As shown in FIG. 12, display device 1200 receives a content signal 1208 (e.g., from processing circuitry), such as a media stream provided in drive signals 424 of FIG. 4. Content signal 1208 includes two-dimensional and/or three-dimensional content for display by screen 1202, depending on the particular display mode and on the number of regions of screen 1202 that are delivering different two- or three-dimensional views to a viewing space.

Content signals 1108 and 1208 may include video content according to any suitable format. For example, content signals 1108 and 1208 may include video content delivered over an HDMI (High-Definition Multimedia Interface) interface, over a coaxial cable, as composite video, as S-Video, a VGA (video graphics array) interface, etc. Note that control signals 1106 and 1206 may be provided separately or in a same signal stream to display devices as their corresponding one of content signals 1108 and 1208.

Further description regarding using a parallax barrier to deliver three-dimensional views, including adaptable versions of parallax barriers, is provided in pending U.S. patent application Ser. No. 12/845,409, titled "Display With Adaptable Parallax Barrier," in pending U.S. patent application Ser. No. 12/845,440, titled "Adaptable Parallax Barrier Supporting Mixed 2D And Stereoscopic 3D Display Regions," and in pending U.S. patent application Ser. No. 12/845,461, titled "Display Supporting Multiple Simultaneous 3D Views," which are each incorporated by reference herein in their entireties. Further description regarding using a lenticular lens to deliver three-dimensional views, including adaptable versions of lenticular lenses, is provided in pending U.S. patent application Ser. No. 12/774,307, titled "Display with Elastic Light Manipulator," which is incorporated by reference herein in its entirety. Example description regarding backlighting that may be integrated in a display that provides three-dimensional views is provided in pending U.S. patent application Ser. No. 12/982,020, titled "Backlighting Array Supporting Adaptable Parallax Barrier," filed on same date herewith, which is incorporated by reference herein in its entirety.

D. Example Electronic Device Implementations

Embodiments may be implemented in hardware, software, firmware, or any combination thereof. For example, 2D and 3D media stream constructor 108, 2D and 3D media stream constructor 304, cast group manager 308, media stream generator 310, decoder 312, view selector 314, view adjustor 316, encoder 318, prior content retriever 320, user interface 404, decoder 414, multisource weaver 416, view adjustor 418, display driver 420, media stream combiner 426, interface circuitry 408, unicast module 502, and multicast module 504 may be implemented as computer program code configured to be executed in one or more processors, and/or as circuit logic (e.g., transistors, resistors, capacitors, field programmable gate arrays, application specific integrated circuits, etc.). Processor 308 and processing circuitry 406 may each be implemented as one or more processors (e.g., CPUs, processing units, microprocessors, graphics processing units, processing logic, etc.) that may or may not be configured to execute computer program code.

Figure 13:
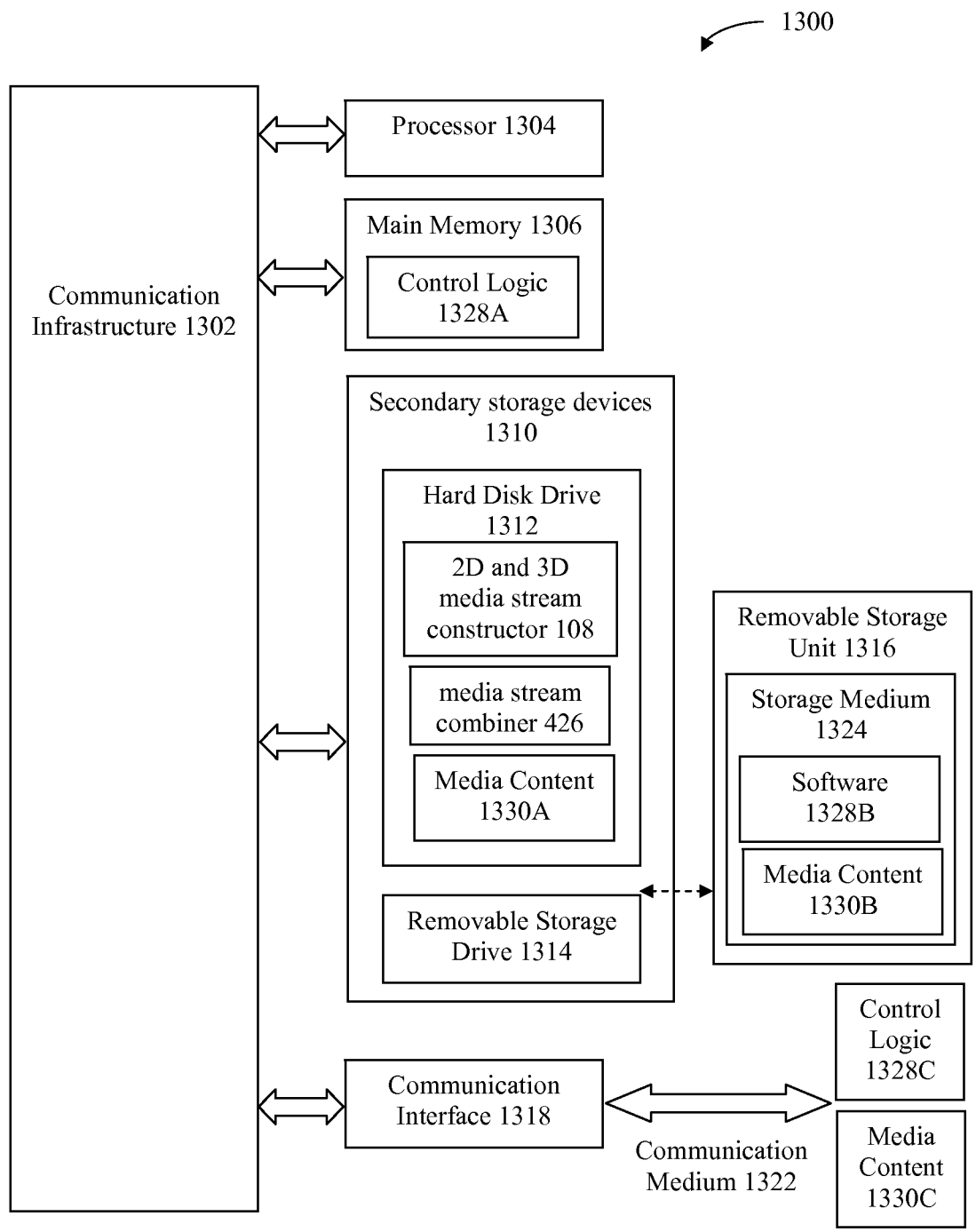
FIG. 13 shows a block diagram of an example electronic device, according to an embodiment.

For instance, FIG. 13 shows a block diagram of an example implementation of an electronic device 1300, according to an embodiment. In embodiments, electronic device 1300 may include one or more of the elements shown in FIG. 13. Media source 102, media source 300, viewer systems 104a and 104b, and/or viewer system 400 may be implemented similarly to electronic device 1300, in embodiments. As shown in the example of FIG. 13, electronic device 1300 may include one or more processors (also called central processing units, or CPUs), such as a processor 1304. Processor 1304 is connected to a communication infrastructure 1302, such as a communication bus. In some embodiments, processor 1304 can simultaneously operate multiple computing threads.

Electronic device 1300 also includes a primary or main memory 1306, such as random access memory (RAM). Main memory 1306 has stored therein control logic 1328A (computer software), and data.

Electronic device 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, electronic device 1300 may include an industry standard interface, such a universal serial bus (USB) interface for interfacing with devices such as a memory stick. Removable storage drive 1314 represents a floppy disk drive, a magnetic tape drive, a compact disk drive, an optical storage device, tape backup, etc.

As shown in FIG. 13, secondary storage devices 1310 may include 2D and 3D media stream constructor 108 and/or media stream combiner 426. 2D and 3D media stream constructor 108 may be present when electronic device 1300 is a media source, and may operate in conjunction with processor 1304 to perform its functions. Media stream combiner 426 may be present when electronic device 1300 is a viewer system, and may operate in conjunction with processor 1304 to perform its functions.

Removable storage drive 1314 interacts with a removable storage unit 1316. Removable storage unit 1316 includes a computer useable or readable storage medium 1324 having stored therein computer software 1328B (control logic) and/or data. Removable storage unit 1316 represents a floppy disk, magnetic tape, compact disk, DVD, optical storage disk, or any other computer data storage device. Removable storage drive 1314 reads from and/or writes to removable storage unit 1316 in a well known manner.

Electronic device 1300 further includes a communication or network interface 1318. Communication interface 1318 enables the electronic device 1300 to communicate with remote devices. For example, communication interface 1318 allows electronic device 1300 to communicate over communication networks or mediums 1342 (representing a form of a computer useable or readable medium), such as LANs, WANs, the Internet, etc. Network interface 1318 may interface with remote sites or networks via wired or wireless connections.

Control logic 1328C may be transmitted to and from electronic device 1300 via the communication medium 1342.

Any apparatus or manufacture comprising a computer useable or readable medium having control logic (software) stored therein is referred to herein as a computer program product or program storage device. This includes, but is not limited to, electronic device 1300, main memory 1306, secondary storage devices 1310, and removable storage unit 1316. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for 2D and 3D media stream constructor 108, 2D and 3D media stream constructor 304, cast group manager 308, media stream generator 310, decoder 312, view selector 314, view adjustor 316, encoder 318, prior content retriever 320, user interface 404, decoder 414, multisource weaver 416, view adjustor 418, display driver 420, media stream combiner 426, interface circuitry 408, unicast module 502, multicast module 504, flowchart 200, flowchart 210, flowchart 600, flowchart 1000 (including any one or more steps of flowcharts 200, 210, 600, and 1000), and/or further embodiments of the present invention described herein. Embodiments of the invention are directed to computer program products comprising such logic (e.g., in the form of program code or software) stored on any computer useable medium (e.g., a computer readable storage medium). Such program code, when executed in one or more processors, causes a device to operate as described herein.

As described herein, electronic device 1300 may be implemented in association with a variety of types of display devices. For instance, electronic device 1300 may be one of a variety of types of media sources, such as an Internet server. Electronic device 1300 may be one of a variety of viewer systems, such as a stand-alone display (e.g., a television display such as flat panel display, etc.), a computer, a game console, a set top box, a digital video recorder (DVR), or other electronic device mentioned elsewhere herein, etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/or a fiber network, etc. For instance, FIG. 13 shows a first media content 1330A that is stored in hard disk drive 1312, a second media content 1330B that is stored in storage medium 1324 of removable storage unit 1316, and a third media content 1330C that may be remotely stored and received over communication medium 1322 by communication interface 1318. Media content 1330 may be stored and/or received in these manners and/or in other ways.

Figure 14:
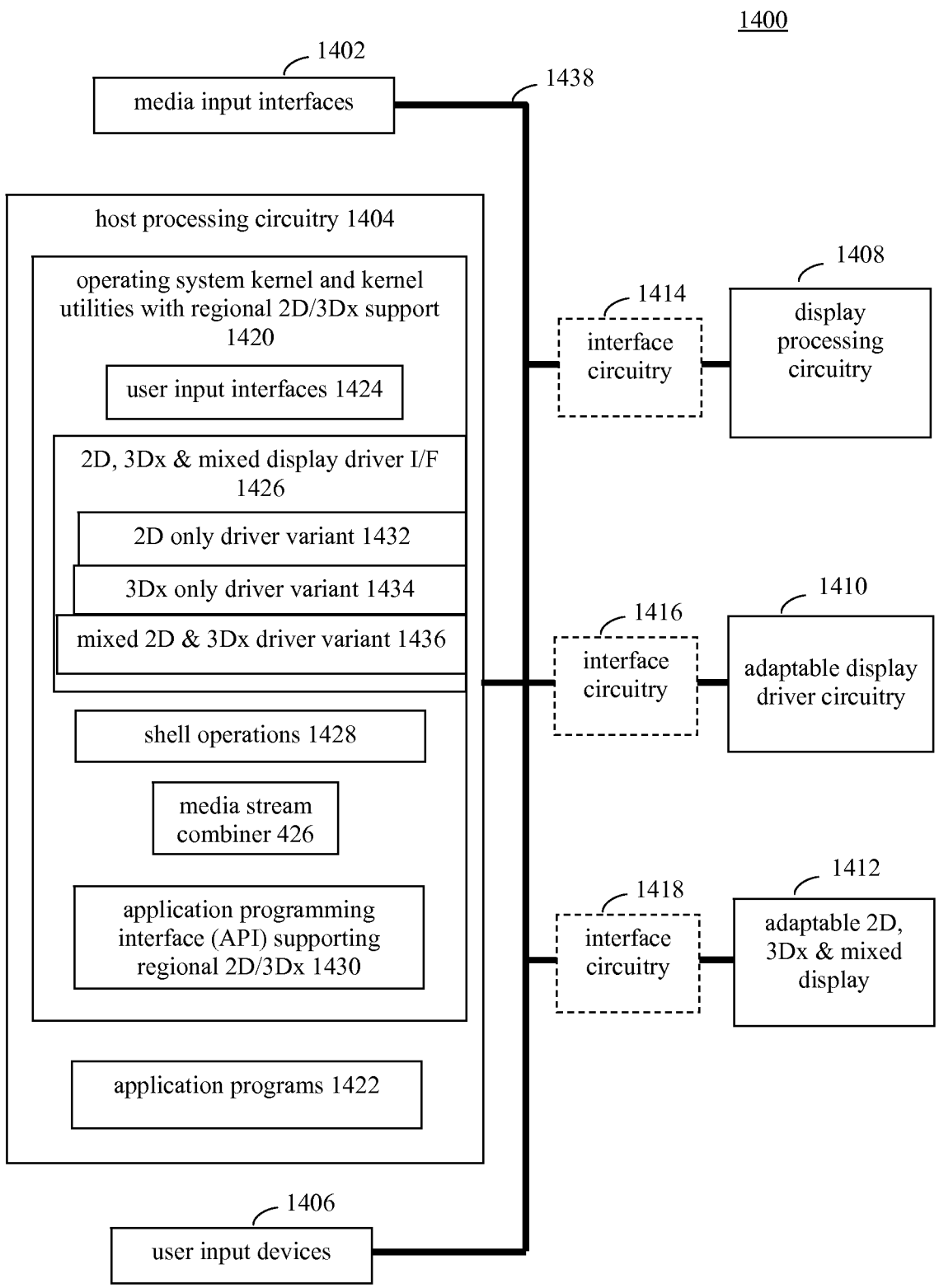
FIG. 14 shows a block diagram of a display system that supports mixed 2D, stereoscopic 3D and multi-view 3D displays, according to an exemplary embodiment.

FIG. 14 shows a block diagram of a display system 1400 that supports mixed 2D, stereoscopic 3D and multi-view 3D displays according to an exemplary embodiment. Display system 1400 is another electronic device embodiment, and is an example of viewer devices 104*a*, 104*b*, and 400. As shown in FIG. 14, display system 1400 includes media input interfaces 1402, host processing circuitry 1404, user input devices 1406, display processing circuitry 1408, adaptable display driver circuitry 1410, adaptable 2D, 3Dx and mixed display 1412, and first-third interface circuitry 1414-1418. Host processing circuitry 1404 includes operating system kernel and kernel utilities with regional 2D/3Dx support 1420 and one or more application programs 1422. Operating system (OS) 1420 includes user input interfaces 1424, 2D, 3Dx and mixed display driver interface 1426, shell operations 1428, media stream combiner 426, and API supporting regional 2D/3Dx 1430. 2D, 3Dx and mixed display driver interface 1426 includes 2D only driver variant 1432, 3Dx only driver variant 1434, and mixed 2D and 3Dx driver variant 1436.

Media input interfaces 1402 includes one or more media input interfaces, wired or wireless, for received media, such as those described elsewhere herein. For instance, media input interface 1402 may include an interface for receiving media content from a local media player device, such as a DVD player, a memory stick, a computer media player, etc., and may include commercially available (e.g., USB, HDMI, etc.) or proprietary interfaces for receiving local media content. Media input interface 1402 may include an interface for receiving media content from a remote source, such as the Internet, satellite, cable, etc., and may include commercially available (e.g., WLAN, Data Over Cable Service Interface Specification (DOCSIS), etc.) or proprietary interfaces for receiving remote media content.

Host processing circuitry 1404 may include one or more integrated circuit chips and/or additional circuitry, which may be configured to execute software/firmware, including operating system 1420 and application programs 1422.

User input devices 1406 includes one or more user input devices that a user may use to interact with display system 1400. Examples of user input devices are described elsewhere herein, such as a keyboard, a mouse/pointer, etc.

Display processing circuitry 1408 may be included in host processing circuitry 1404, or may be separate from host processing circuitry 1404 as shown in FIG. 14. For instance, display processing circuitry 1408 may include one or more processors (e.g., graphics processors), further circuitry and/or other hardware, software, firmware, or any combination thereof. Display processing circuitry 1408 may be present to perform graphics processing tasks, including transcoding.

Adaptable display driver circuitry 1410 includes one or more display driver circuits for an adaptable display.

Adaptable 2D, 3Dx and mixed display 1412 includes a display that is adaptable, and is capable of displaying 2D content, 3D content, and a mixture of 2D and/or 3D content. Examples of adaptable 2D, 3Dx and mixed display 1412 are described elsewhere herein.

First-third interface circuitry 1414-1418 is optional. For instance, as shown in FIG. 14, a communication infrastructure (e.g., a signal bus) 1438 may be present to couple signals of media input interfaces 1402, host processing circuitry 1404, user input devices 1406, display processing circuitry 1408, adaptable display driver circuitry 1410, and display 1412. In an embodiment, if display processing circuitry 1408, adaptable display driver circuitry 1410, and/or display 1412 are contained in a common housing/structure with host processing circuitry 1404 (e.g., in a handheld device, etc.) interface circuitry 1414-1418 may not be needed to be present. If display processing circuitry 1408, adaptable display driver circuitry 1410, and/or display 1412 are in a separate housing/structure from host processing circuitry 1404, corresponding interface circuitry 1414-1418 may be present to provide an interface. For instance, host processing circuitry 1404 may be in a game console, a desktop computer tower, a home audio receiver, a set top box, etc., and display processing circuitry 1408, adaptable display driver circuitry 1410, and/or display 1412 may be included in a display device structure. In such case, interface circuitry 1414-1418 may not be present. When present, first-third circuitry 1414-1418 may each include circuitry, such as receivers and/or transmitters (wired or wireless), for enabling communications between the respective one of display processing circuitry 1408, adaptable display driver circuitry 1410, and display 1412, and the other components of system 1400 (e.g., host processing circuitry 1404, etc.).

OS 1420 provides a platform on which programs, such as application programs 1422, may be executed. OS 1420 may be implemented in software (e.g., computer programs and/or data). OS 1420 manages hardware, provides common services, enables execution of application programs 1422, and enables application programs 1422 to access hardware. Application programs 1422 may call OS 1420 and/or be interrupted by OS 1420 for various reasons.

Application programs 1422 are optional, and are examples of applications that may be interfaced with displays 1412. One or more of application programs 1422 may separately or simultaneously execute and interact with OS 1420 to provide content for display by displays display 1412, include internally generated content and/or externally received content. Application programs 1422 may set up and control multiple separate display screen regions of display 1412 that each display 2D, 3D, or 3Dx content.

API supporting regional 2D/3Dx 1430 is configured to interface one or more applications (e.g., application programs 1422) with OS 1420, and thereby interface the applications with display device 1412. API supporting regional 2D/3Dx 1430 is configured to enable applications to access various display functions, including enabling regional definition for 2D, 3D, and 3Dx content displayed by display screens and further display functions.

User input interfaces 1424 are configured to receive user input to enable a person to interact with display system 1400, application programs 1422, and content displayed by display 1412.

2D, 3Dx & mixed display driver interface 1426 enables application programs 1422 to interface with OS 1420 via API 1430 to provide and control two- and/or three-dimensional content displayed at a display device 1412. For instance, 2D, 3Dx & mixed display driver interface 1426 may forward commands (e.g., from application programs 1422) to 2D only driver variant 1432 when a 2D-only display is present, enabling only 2D-related commands to be processed. 2D, 3Dx & mixed display driver interface 1426 may forward commands to 3Dx only driver variant 1434 when display 1412 is present, enabling 2D or 3Dx related commands to be processed. 2D, 3Dx & mixed display driver interface 1426 may forward commands to mixed 2D and 3Dx driver variant 1436 when display 1412 is regionally configurable, enabling regional 2D or 3Dx related commands to be processed.

Shell operations 1428 may be present in OS 1420 to control and/or enable user configuration of environmental properties, such as the 2D and/or 3D display configuration of an environmental background, of desktop icons, of displayed windows, etc. In embodiments, shell operations 1428 may be implemented in hardware, software, firmware, or any combination thereof, including as a shell operations module.

Note that the embodiment of display system 1400 shown in FIG. 14 is provided for purposes of illustration, and is not intended to be limiting. In further embodiments, display system 1400 may include fewer, additional, and/or alternative features than shown in FIG. 14.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method used by a media source to deliver at least portions of media content to a first viewer system and a second viewer system, the media content being three-dimensional content representing a first visual perspective, a second visual perspective, a third visual perspective and a fourth visual perspective, the method comprising:
   receiving a first request from the first viewer system for a primary media stream;
   constructing the primary media stream from a first portion of the media content, the first portion containing representations of at least one but not all of the first visual perspective, the second visual perspective, the third visual perspective and the fourth visual perspective;
   delivering the primary media stream to the first viewer system;
   receiving a second request from the second viewer system for a second media stream, the second request being received after having delivered a first portion of the primary media stream to the first viewer system;
   constructing a secondary media stream from a second portion of the media content, the second portion containing representations of at least one but not all of the first visual perspective, the second visual perspective, the third visual perspective and the fourth visual perspective, the second portion containing a representation of at least one visual perspective not included in the first portion of the media content;
   constructing a tertiary media stream based on the first part of the primary media stream; and
   delivering the tertiary media stream to the second viewer system; and
   delivering both the primary media stream and the secondary media stream to the second viewer system to enable the primary and secondary media streams to be combined to generate a stereoscopic three-dimensional view for display by a display screen of the second viewer system.

2. The method of claim 1, wherein the primary media stream supports a two-dimensional presentation, and both the primary media stream and the secondary media stream together support a three-dimensional presentation.

3. The method of claim 1, wherein the primary media stream represents at least two of the first visual perspective, the second visual perspective, the third visual perspective and the fourth visual perspective.

4. The method of claim 1, wherein the portion of the primary media stream subsequent to the first portion of the primary media stream is multi-cast to both the first viewer system and the second viewer system.

5. The method of claim 4, further comprising removing at least one of the first viewer system and the second viewer system from the multi-cast.

6. The method of claim 5, wherein said removing is based on a difference between a first communication characteristic associated with the first viewer system and a second communication characteristic associated with the second viewer system.

7. The method of claim 1, wherein said constructing comprises:
constructing a tertiary media stream that includes the first portion of the primary media stream and a corresponding portion of the media content requested for the secondary media stream;
wherein said delivering the tertiary media stream comprises:
delivering the tertiary media stream to the second viewer system to enable a first portion of a stereoscopic three-dimensional view to be displayed by a display screen of the second viewer system; and
wherein said delivering both the primary media stream and the secondary media stream comprises:
delivering the secondary media stream and a portion of the primary media stream subsequent to the first portion of the primary media stream to the second viewer system to enable the primary and secondary media streams to be combined to generate a second portion of the stereoscopic three-dimensional view for display by the display screen of the second viewer system.

8. A media source that delivers at least portions of media content to a first viewer system and a second viewer system, the media content representing a plurality of camera perspectives of a single media product, the media source comprising:
a communication interface through which a first request and a second request are both received, the first request being from the first viewer system and the second request being from the second viewer system; and
a processor that responds to the first request from the first viewer system by delivering a primary media stream via the communication interface to the first viewer system, the primary media stream containing a representation of at least a first of the plurality of camera perspectives, a first portion of the primary media stream already delivered to the first viewer system when the second request is received;
the processor responds to the second request from the second viewer system by delivering at least a portion of both the primary media stream and a secondary media stream to the second viewer system via the communication interface, and delivering a tertiary media stream to the second viewer system based on the first part of the primary media stream, the secondary media stream containing a representation of at least a second of the plurality of camera perspectives, the representation of the second of the plurality of camera perspectives not being included in the primary media stream, to enable the primary, the secondary, and the tertiary media streams to be combined to generate a stereoscopic three-dimensional view for display by a display screen of the second viewer system.

9. The media source of claim 8, wherein the primary media stream supports a two-dimensional presentation, and the tertiary media stream supports a three-dimensional presentation.

10. The media source of claim 8, wherein the primary media stream represents at least two of the plurality of camera perspectives.

11. The media source of claim 8, wherein at least the portion of the primary media stream subsequent to the first portion is multi-cast to both the first viewer system and the second viewer system.

12. The media source of claim 8, wherein the secondary media stream is not delivered to the first viewer system.

13. The media source of claim 11, wherein the processor removes at least one of the first viewer system and the second viewer system from the multi-cast.

14. The media source of claim 8, wherein the remaining portion of the primary media stream is multi-cast to both the first viewer system and the second viewer system if both a first communication characteristic of the first viewer system and a second communication characteristic of the second viewer system are relatively similar.

15. The media source of claim 8, wherein the processor responds to the second request from the second viewer system by delivering a portion of the primary media stream subsequent to the first portion, the secondary media stream, and the tertiary media stream to the second viewer system via the communication interface to enable the primary, the secondary, and the tertiary media streams to generate a stereoscopic three-dimensional view for display by the display screen of the second viewer system.

16. A media source that delivers at least portions of media content to a first viewer system and a second viewer system, the media content representing a plurality of camera perspectives of a single media product, the media source comprising:
a communication interface through which a first request and a second request are both received, the first request being from the first viewer system and the second request being from the second viewer system; and
a processor that responds to the first request from the first viewer system by delivering a primary media stream via the communication interface to the first viewer system, the primary media stream containing a representation of at least a first of the plurality of camera perspectives;
the processor responds to the second request from the second viewer system by delivering both the primary media stream and a secondary media stream to the second viewer system via the communication interface, the secondary media stream containing a representation of at least a second of the plurality of camera perspectives, the representation of the second of the plurality of camera perspectives not being included in the primary media stream, to enable the primary and secondary media streams to be combined to generate a stereoscopic three-dimensional view for display by a display screen of the second viewer system, at least a portion of the primary media stream being multi-cast to both the first viewer system and the second viewer system, wherein the processor removes at least one of the first viewer system and the second viewer system from the multi-cast based on a difference between a first communication characteristic associated with the first viewer system and a second communication characteristic associated with the second viewer system.

17. Viewer system circuitry that receives at least a portion of media content from a media source, the media source simultaneously servicing multiple viewers at differing premises, the media content representing a plurality of camera perspectives of a single media product, the viewer system circuitry supporting display of the at least the portion of the media content via a screen assembly, the viewer system circuitry comprising:
communication interface circuitry operable to communicatively couple with the media source;
display interface circuitry operable to communicatively couple with the screen assembly; and
processing circuitry that delivers to the media source a first request for the at least the portion of the media content received, the delivery being via the communication interface circuitry;
the processing circuitry receives, from the media source in response to the first request and via the communication interface circuitry, primary media content, secondary media content, and tertiary media content, the primary media content containing a representation of at least a first of the plurality of camera perspectives, the secondary media content containing a representation of at least a second of the plurality of camera perspectives, the representation of the second of the plurality of camera perspectives not being included in the primary media content, and the tertiary media content being a beginning portion of the single media product not represented in the primary media content and not represented in the secondary media content; and the processing circuitry establishes a communication flow toward the screen assembly via the display interface circuitry, the communication flow representing at least both of the first of the plurality of camera perspectives and the second of the plurality of camera perspectives to enable at least the first and second of the plurality of camera perspectives to be displayed in a stereoscopic three-dimensional view.

18. The viewer system circuitry of claim 17, wherein the primary media content is provided by the media source in a multi-cast format.

19. The viewer system circuitry of claim 17, wherein at least a portion of the secondary media content is provided by the media source in a uni-cast format.

20. The viewer system circuitry of claim 17, wherein the processing circuitry directs storage of at least a representation of the primary media content and the secondary media content.

21. The viewer system circuitry of claim 17, wherein the primary media content is provided by the media source with destination addressing that changes over time.

\* \* \* \* \*

UNITED STATES PATENT AND TRADEMARK OFFICE
CERTIFICATE OF CORRECTION

PATENT NO. : 9,013,546 B2  
APPLICATION NO. : 12/982212  
DATED : April 21, 2015  
INVENTOR(S) : Jeyhan Karaoguz et al.

Page 1 of 1

It is certified that error appears in the above-identified patent and that said Letters Patent is hereby corrected as shown below:

On the title page, item (56), in column 2, under "Other Publications", line 1-2, below "Other Publications" insert -- European Search Report received for European Patent application Number 10016055.5, mailed on April 12, 2011, 3 pages. --.

On page 3, in column 2, under "Other Publications", line 23, delete "10016055.May 1904," and insert -- 10016055.5-1904, --, therefor.

In the specification,

In column 1, line 34, delete "herewith; and" and insert -- herewith. --, therefor.

In the claims,

In column 33, line 25, in claim 19, delete "uni-cast" and insert -- unicast --, therefor.

Signed and Sealed this  
Twelfth Day of January, 2016

Michelle K. Lee  
*Director of the United States Patent and Trademark Office*